US012598618B2

(12) United States Patent
Khoshnevisan et al.

(10) Patent No.: US 12,598,618 B2
(45) Date of Patent: Apr. 7, 2026

(54) SOUNDING REFERENCE SIGNAL RESOURCE INDICATORS ASSOCIATED WITH CONFIGURED GRANT PHYSICAL UPLINK SHARED CHANNEL REPETITION

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 18/054,389

(22) Filed: Nov. 10, 2022

(65) Prior Publication Data

US 2023/0156726 A1     May 18, 2023

Related U.S. Application Data

(60) Provisional application No. 63/264,033, filed on Nov. 12, 2021.

(51) Int. Cl.
*H04W 72/14* (2009.01)
*H04L 5/00* (2006.01)
(Continued)

(52) U.S. Cl.
CPC ........... *H04W 72/23* (2023.01); *H04L 5/0048* (2013.01); *H04W 72/1268* (2013.01)

(58) Field of Classification Search
CPC ... H04L 5/0048; H04L 5/0051; H04L 5/0091; H04L 5/0094; H04W 72/1268; H04W 72/23
See application file for complete search history.

(56) References Cited

U.S. PATENT DOCUMENTS

2019/0274155 A1*   9/2019   Bhattad ................. H04L 5/0073
2020/0336990 A1   10/2020   Chen et al.
(Continued)

FOREIGN PATENT DOCUMENTS

EP          3879738 A1     9/2021
TW       202118340 A     5/2021
(Continued)

OTHER PUBLICATIONS

International Search Report and Written Opinion—PCT/US2022/079730—ISA/EPO—Mar. 27, 2023.
Taiwan Search Report—TW111143162—TIPO—Dec. 3, 2025.

*Primary Examiner* — Mansour Oveissi
(74) *Attorney, Agent, or Firm* — Paul M. McAdams; Harrity & Harrity LLP

(57) ABSTRACT

Various aspects of the present disclosure generally relate to wireless communication. In some aspects, a user equipment (UE) may receive a configured grant (CG) physical uplink shared channel (PUSCH) configuration comprising at least one sounding reference signal (SRS) resource indicator, associated with at least one set of PUSCH repetitions, that indicates at least one SRS resource corresponding to at least one SRS resource set, wherein the at least one SRS resource set is listed in at least one of a first or a second SRS resource set list, wherein at least one SRS resource set listed in the second SRS resource set list is a subset of a corresponding SRS resource set listed in the first SRS resource set list. The UE may determine at least one set of PUSCH transmission parameters based at least in part on a determination of the at least one SRS resource set. Numerous other aspects are provided.

30 Claims, 8 Drawing Sheets

(51) Int. Cl.
  H04W 72/1268    (2023.01)
  H04W 72/23     (2023.01)

(56)        References Cited

U.S. PATENT DOCUMENTS

2021/0378006 A1*  12/2021  Takeda .................. H04W 52/04
2023/0189254 A1*   6/2023  Go ........................... H04B 7/06
                                                                 370/329

FOREIGN PATENT DOCUMENTS

WO     WO-2020090091 A1    5/2020
WO     WO-2021161272 A1    8/2021

* cited by examiner

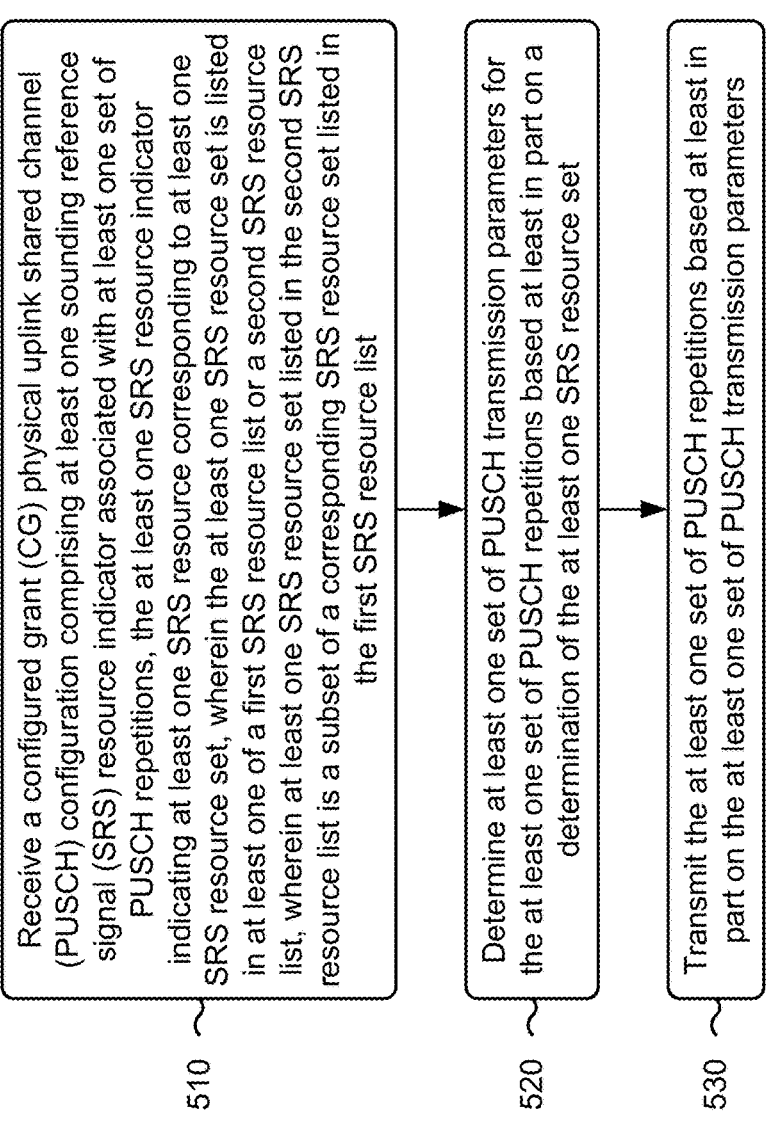

510 Receive a configured grant (CG) physical uplink shared channel (PUSCH) configuration comprising at least one sounding reference signal (SRS) resource indicator associated with at least one set of PUSCH repetitions, the at least one SRS resource indicator indicating at least one SRS resource corresponding to at least one SRS resource set, wherein the at least one SRS resource set is listed in at least one of a first SRS resource list or a second SRS resource list, wherein at least one SRS resource set listed in the second SRS resource list is a subset of a corresponding SRS resource set listed in the first SRS resource list 520 Determine at least one set of PUSCH transmission parameters for the at least one set of PUSCH repetitions based at least in part on a determination of the at least one SRS resource set 530 Transmit the at least one set of PUSCH repetitions based at least in part on the at least one set of PUSCH transmission parameters

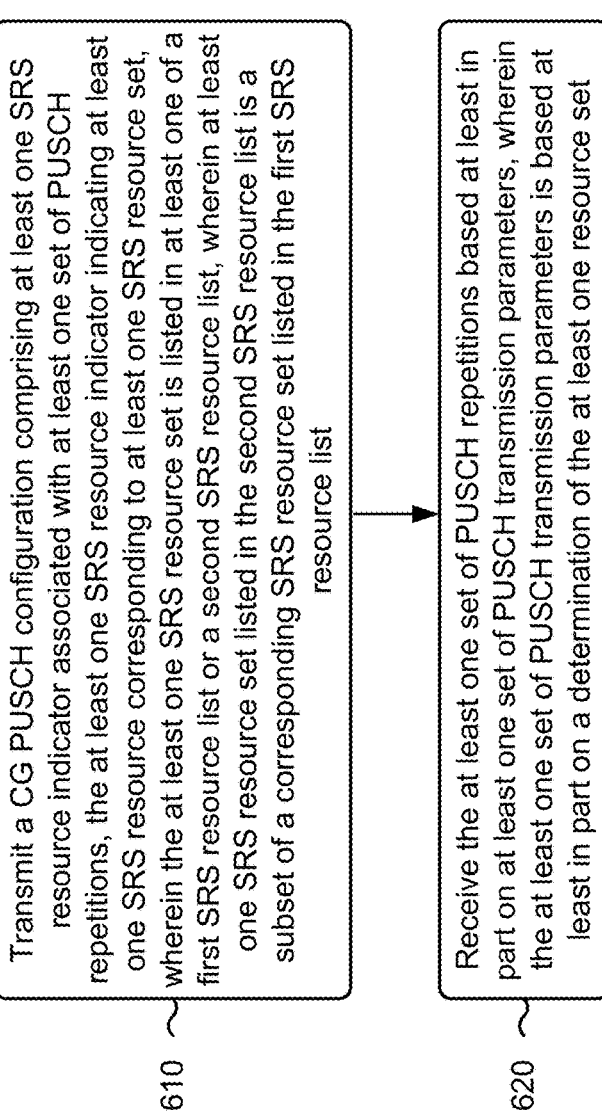

610 — Transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource list or a second SRS resource list, wherein at least one SRS resource set listed in the second SRS resource list is a subset of a corresponding SRS resource set listed in the first SRS resource list 620 — Receive the at least one set of PUSCH repetitions based at least in part on at least one set of PUSCH transmission parameters, wherein the at least one set of PUSCH transmission parameters is based at least in part on a determination of the at least one resource set

FIGURE 6

SOUNDING REFERENCE SIGNAL RESOURCE INDICATORS ASSOCIATED WITH CONFIGURED GRANT PHYSICAL UPLINK SHARED CHANNEL REPETITION

CROSS-REFERENCE TO RELATED APPLICATION

This patent application claims priority to U.S. Provisional Patent Application No. 63/264,033, filed on Nov. 12, 2021, entitled "SOUNDING REFERENCE SIGNAL RESOURCE INDICATORS ASSOCIATED WITH CONFIGURED GRANT PHYSICAL UPLINK SHARED CHANNEL REPETITION," and assigned to the assignee hereof. The disclosure of this prior application is considered part of and is incorporated by reference into this patent application in its entirety.

FIELD OF THE DISCLOSURE

Aspects of the present disclosure generally relate to wireless communication and specifically, to techniques and apparatuses for sounding reference signal indicators associated with configured grant physical uplink shared channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some situations, one or more sets of physical uplink shared channel (PUSCH) repetitions can be associated with one or more sounding reference signal (SRS) resource sets respectively, but the UE may not have an ability to determine which SRS resource sets are to be associated with which sets of PUSCH repetitions. Thus, the UE can be unable to determine transmission parameters for the two sets of PUSCH repetitions and, as a result, can fail to transmit one or more of the sets of PUSCH repetitions or can transmit one or more of the sets of the PUSCH repetitions in an ineffective manner, having a negative impact on network performance.

SUMMARY

Some aspects described herein relate to a method of wireless communication performed by a user equipment (UE). The method may include receiving a configured grant (CG) physical uplink shared channel (PUSCH) configuration comprising at least one sounding reference signal (SRS) resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The method may include determining at least one set of PUSCH transmission parameters for the at least one set of PUSCH repetitions based at least in part on a determination of the at least one SRS resource set. The method may include transmitting the at least one set of PUSCH repetitions based at least in part on the at least one set of PUSCH transmission parameters.

Some aspects described herein relate to a method of wireless communication performed by a base station. The method may include transmitting a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The method may include receiving the at least one set of PUSCH repetitions based at least in part on at least one set of PUSCH transmission parameters, wherein the at least one set of PUSCH transmission parameters is based at least in part on a determination of the at least one resource set.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The processor-readable code, when executed by the at least one processor, may be configured to cause the user equipment to determine at least one set of PUSCH transmission parameters for the at least one set of PUSCH repetitions based at least in part on a determination of the at least one SRS resource set. The processor-readable code, when executed by the at least one processor, may be configured to cause the user equipment to transmit the at least one set of PUSCH repetitions based at least in part on the at least one set of PUSCH transmission parameters.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The processor-readable code, when executed by the at least one processor, may be configured to cause the base station to receive the at least one set of PUSCH repetitions based at least in part on at least one set of PUSCH transmission parameters, wherein the at least one set of PUSCH transmission parameters is based at least in part on a determination of the at least one resource set.

Some aspects described herein relate to a non-transitory computer-readable medium that stores a set of instructions for wireless communication by a UE. The set of instructions, when executed by one or more processors of the UE, may cause the UE to receive a CG PUSCH configuration comprising at least one SRS resource indicator associated with at least one set of PUSCH repetitions, the at least one SRS resource indicator indicating at least one SRS resource corresponding to at least one SRS resource set, wherein at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The set of instructions, when executed by one or more processors of the UE, may cause the UE to determine at least one set of PUSCH transmission parameters for the at least one set of PUSCH repetitions based at least in part on a determination of the at least one SRS resource set. The set of instructions, when executed by one or more processors of the UE, may cause the UE to transmit the at least one set of PUSCH repetitions based at least in part on the at least one set of PUSCH transmission parameters.

Some aspects described herein relate to a non-transitory computer-readable medium that stores a set of instructions for wireless communication by a base station. The set of instructions, when executed by one or more processors of the base station, may cause the base station to transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The set of instructions, when executed by one or more processors of the base station, may cause the base station to receive the at least one set of PUSCH repetitions based at least in part on at least one set of PUSCH transmission parameters, wherein the at least one set of PUSCH transmission parameters is based at least in part on a determination of the at least one resource set.

Some aspects described herein relate to an apparatus for wireless communication. The apparatus may include means for receiving a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The apparatus may include means for determining at least one set of PUSCH transmission parameters for the at least one set of PUSCH repetitions based at least in part on a determination of the at least one SRS resource set. The apparatus may include means for transmitting the at least one set of PUSCH repetitions based at least in part on the at least one set of PUSCH transmission parameters.

Some aspects described herein relate to an apparatus for wireless communication. The apparatus may include means for transmitting a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The apparatus may include means for receiving the at least one set of PUSCH repetitions based at least in part on at least one set of PUSCH transmission parameters, wherein the at least one set of PUSCH transmission parameters is based at least in part on a determination of the at least one resource set.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 5 is a flowchart illustrating an example process performed, for example, by a UE that supports SRS resource indicators associated with CG PUSCH repetition in accordance with the present disclosure.

FIG. 6 is a flowchart illustrating an example process performed, for example, by a base station that supports SRS resource indicators associated with CG PUSCH repetition in accordance with the present disclosure.

DETAILED DESCRIPTION

Figure 1:
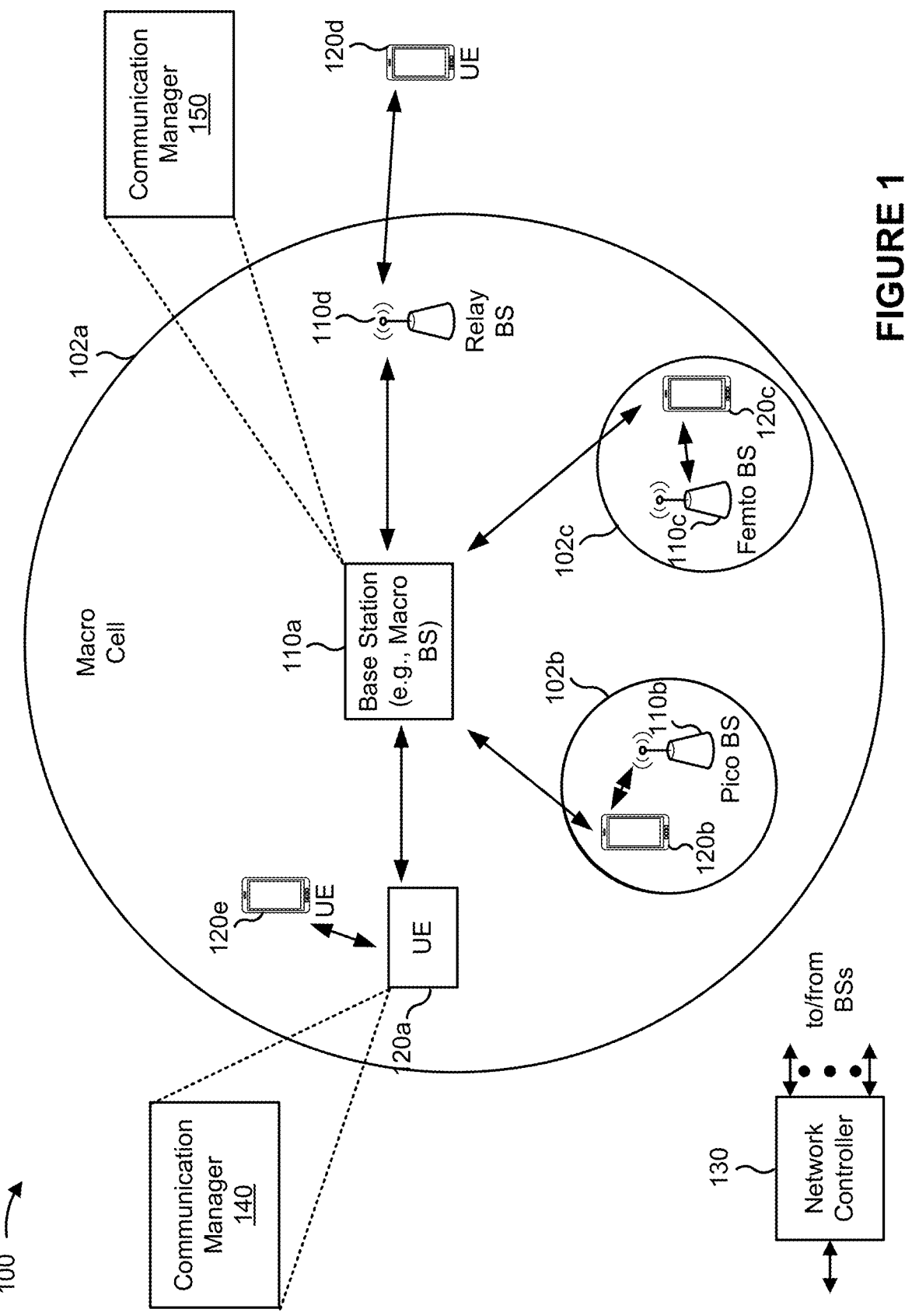
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to interpretation of radio resource control (RRC) configured sounding reference signal (SRS) resource indicators for determining physical uplink shared channel (PUSCH) transmission parameters for Type 1 configured grant (CG) PUSCH repetition. Some aspects more specifically relate to receiving a CG PUSCH configuration that includes at least one SRS resource indicator associated with at least one set of PUSCH repetitions and determining at least one set of PUSCH transmission parameters based at least in part on the at least one SRS resource indicator. In some aspects, a UE may determine at least one SRS resource set associated with at least one set of PUSCH repetitions. In some aspects, the UE may determine which SRS resources of the determined at least one SRS resource set are to be used. In some aspects, the UE may determine at least one set of PUSCH transmission parameters based at least in part on the determined SRS resources to be used.

Particular aspects of the subject matter described in this disclosure can be implemented to realize one or more of the following potential advantages. In some examples, the described techniques can be used to facilitate transmission of at least one set of PUSCH repetitions using transmission parameters associated with one or more SRS resource sets. In some examples, the described techniques can be used to facilitate multiple transmission reception point (mTRP) Type 1 CG PUSCH repetition, thereby having a positive impact on network performance.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list; determine at least one set of PUSCH transmission parameters for the at least one set of PUSCH repetitions based at least in part on a determination of the at least one SRS resource set; and transmit the at least one set of PUSCH repetitions based at least in part on the at least one set of PUSCH transmission parameters. Additionally or alternatively, the communication manager 140 may perform one or more other operations described herein.

In some aspects, the base station 110 may include a communication manager 150. As described in more detail elsewhere herein, the communication manager 150 may transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list; and receive the at least one set of PUSCH repetitions based at least in part on at least one set of PUSCH transmission parameters, wherein the at least one set of PUSCH transmission parameters is based at least in part on a determination of the at least one resource set.

Additionally or alternatively, the communication manager 150 may perform one or more other operations described herein.

Figure 2:
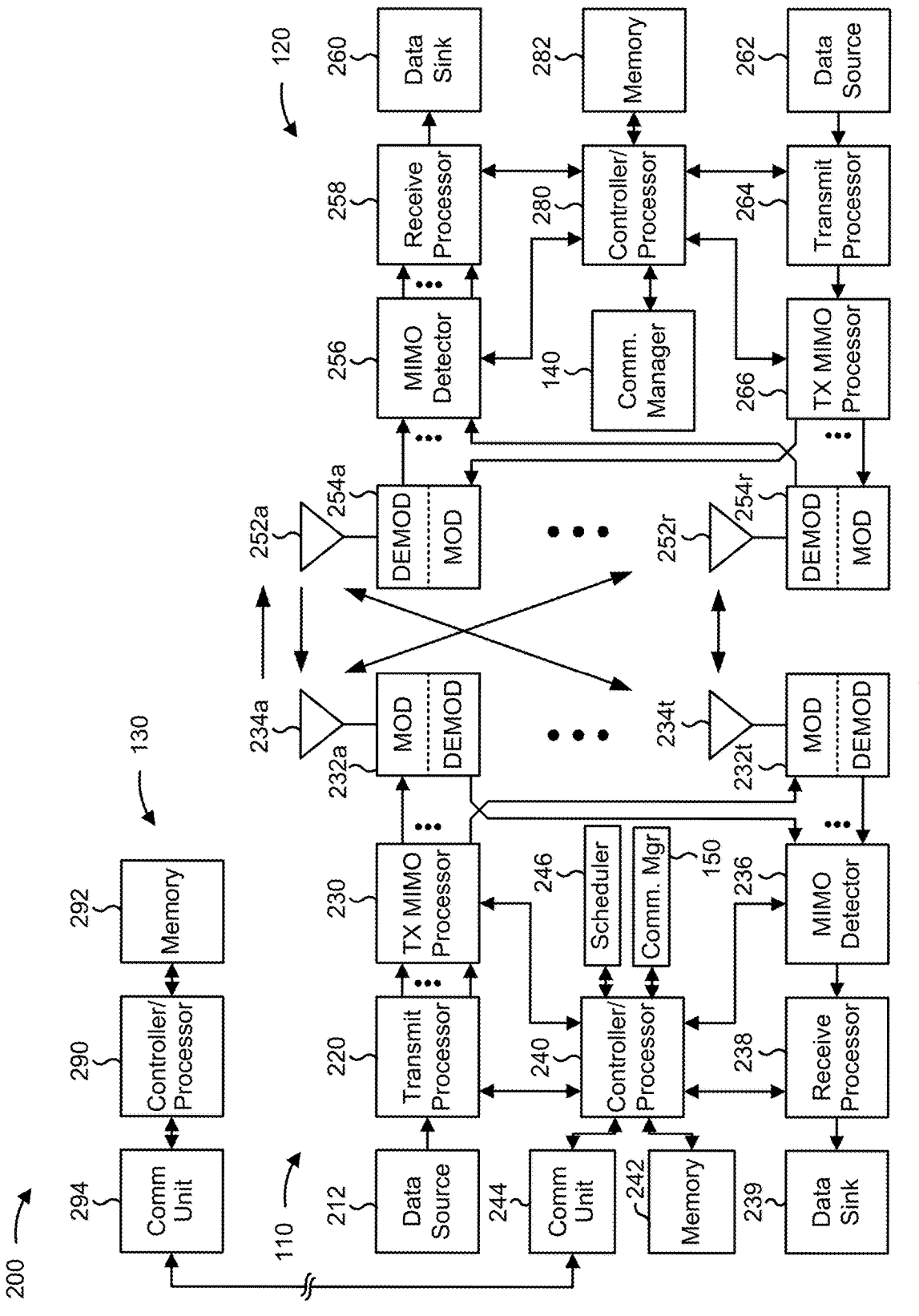
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with SRS indicators associated with CG PUSCH repetition, as described in more detail elsewhere herein. For example, the controller/processor 240 of the base station 110, the controller/processor 280 of the UE 120, or any other component(s) of FIG. 2 may perform or direct operations of, for example, process 500 of FIG. 5, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, or other processes as described herein. In some examples, executing instructions may include running the instructions, converting the instructions, compiling the instructions, or interpreting the instructions, among other examples.

In some aspects, the UE includes means for receiving a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list; means for determining at least one set of PUSCH transmission parameters for the at least one set of PUSCH repetitions based at least in part on a determination of the at least one SRS resource set; or means for transmitting the at least one set of PUSCH repetitions based at least in part on the at least one set of PUSCH transmission parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list; or means for receiving the at least one set of PUSCH repetitions based at least in part on at least one set of PUSCH transmission parameters, wherein the at least one set of PUSCH transmission parameters is based at least in part on a determination of the at least one resource set. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

A base station 110 may configure a UE 120 with one or more SRS resource sets to allocate resources for SRS transmissions by the UE 120. For example, a configuration for SRS resource sets may be indicated in a radio resource control (RRC) message (for example, an RRC configuration message or an RRC reconfiguration message). An SRS resource set may include one or more SRS resources, which may include time resources or frequency resources (for example, a slot, a symbol, a resource block, or a periodicity for the time resources). An SRS resource indicator (SRI) field in a downlink control information (DCI) transmission may be used to indicate SRS resources to be used for an uplink transmission. The SRI may indicate the uplink transmission rank and the set of precoders for the UE to use for the uplink transmission.

An SRS resource may include one or more antenna ports on which an SRS is to be transmitted (for example, in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (for example, in an SRS-ResourceSet information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (for example, an SRS transmitted using a resource of an antenna switching SRS resource set) to acquire downlink CSI (for example, to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (for example, using a precoder codebook), the base station 110 may use a codebook SRS (for example, an SRS transmitted using a resource of a codebook SRS resource set) to acquire uplink CSI (for example, to determine an uplink precoder to be indicated to the UE 120 and used by the UE 120 to communicate with the base station 110). In some aspects, virtual ports (for example, a combination of two or more antenna ports) with a maximum transmit power may be supported at least for a codebook SRS.

A codebook SRS resource set also may be used to facilitate codebook-based physical uplink shared channel (PUSCH) transmission. In codebook-based PUSCH transmission, a UE can be configured with only one SRS resource set with a "usage" indicator set to "codebook." In codebook-based PUSCH transmission, a maximum of 4 SRS resources within the set can be configured for the UE. Each SRS resource can be RRC-configured with a number of ports (for example, using a parameter nrofSRS-Ports). The SRI field in the DCI that schedules the PUSCH can indicate one SRS resource. The number of ports configured for the indicated SRS resource determines the number of antenna ports used for the PUSCH transmission. In codebook-based PUSCH transmission, the PUSCH transmission is transmitted with the same spatial domain filter (for example, uplink beam) as the indicated SRS resources. The number of transmission layers (rank) and the transmitted precoding matrix indicator (TPMI) for the scheduled PUSCH is determined from a separate DCI field.

A non-codebook SRS resource set may be used to indicate uplink CSI when the UE 120 selects an uplink precoder (for example, instead of the base station 110 indicated an uplink precoder to be used by the UE 120). For example, when the UE 120 is configured to select an uplink precoder, the base station 110 may use a non-codebook SRS (for example, an SRS transmitted using a resource of a non-codebook SRS resource set) to acquire uplink CSI. In this case, the non-codebook SRS may be precoded using a precoder selected by the UE 120 (for example, which may be indicated to the base station 110).

A non-codebook SRS resource set also may be used to facilitate non-codebook-based PUSCH transmission. In non-codebook-based PUSCH transmission, a UE can be configured with only one SRS resource set with the "usage" indicator set to "noncodebook." In non-codebook PUSCH transmission, a maximum of 4 SRS resources within the set can be configured for the UE. Each SRS resource has one port. The SRI field in the DCI that schedules the PUSCH transmission can indicate one or multiple SRS resources. The number of indicated SRS resources determines the rank for the scheduled PUSCH transmission, and the PUSCH transmission is transmitted with the same precoder as well as the same spatial domain filter (for example, beam) as the indicated SRS resources.

In some cases, a wireless communication standard may specify one or more SRI indication tables to facilitate SRI signaling. SRI indication tables can be used to identify SRS resources based on a number of SRS resources indicated by an SRI, as well as to indicate a number of bits used to transmit the SRI. For example, according to a wireless communication standard, a number of bits used to transmit an SRI can be calculated as $[\log_2(N_{SRS})]$ bits based on an SRI table, where a usage indicator is set to codebook, and $N_{SRS}$ is the number of configured SRS resources in an SRS resource set configured by an SRS resource set list (for example, represented by a higher layer parameter srs-ResourceSetToAddModList). Table 1 depicts an example of an SRI table for codebook based PUSCH transmission, where $N_{SRS}=4$.

TABLE 1

| Bit field mapped to index | SRI(s), $N_{SRS} = 4^1$ |
|---|---|
| 0 | 0 |
| 1 | 1 |
| 2 | 2 |
| 3 | 3 |

In some cases, according to a wireless communication standard, a number of bits used to transmit an SRI can be calculated as $$\left\lceil \log_2\left( \sum_{k=1}^{\min\{L_{max}, N_{SRS}\}} \binom{N_{SRS}}{k} \right) \right\rceil$$

bits based on an SRI table, where a usage indicator indicates noncodebook, $L_{max}$ indicates a maximum number of transmission layers, and $N_{SRS}$ is the number of configured SRS resources in an SRS resource set configured by an SRS resource set list (for example, represented by a higher layer parameter srs-ResourceSetToAddModList). Table 2 depicts an example of an SRI table for non-codebook based PUSCH transmission, where $L_{max}$=4.

TABLE 2

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14 | 0, 1, 2, 3 |
| | | | | 15 | reserved |

As indicated above, DCI transmissions may be used to transmit SRIs for codebook or non-codebook based PUSCH when PUSCH is scheduled by a DCI, as in the case of dynamic grant PUSCH (DG-PUSCH), or activated by a DCI, as in the case of Type 2 CG PUSCH. However, for Type 1 CG PUSCH, all parameters are RRC configured (for example, not indicated in DCI). An SRS resource indicator in these cases can be an RRC parameter "srs-ResourceIndicator," which can be configured as part of that CG configuration in a CG configuration parameter ("rrc-ConfiguredUplinkGrant"). This SRS resource indicator determines the SRS resource or SRS resources associated with the PUSCH transmission, which in turn determines the beam, precoding, and number of PUSCH ports for the PUSCH transmission for Type 1 CG PUSCH. This RRC parameter "srs-ResourceIndicator" can be interpreted based on specified SRI tables (for example, Table 1 or Table 2, above). The interpretation can depend on codebook versus non-codebook based PUSCH as well as the number of SRS resources in the SRS resource set (similar to the case of DG-PUSCH).

Some wireless communication standards specify a DCI format 0_2 for scheduling PUSCH. The purpose of the DCI format 0_2 is DCI size reduction by decreasing the number of bits needed for each DCI field based on RRC configuration. SRS resource sets (for both codebook and non-codebook) can be separately configured for PUSCH scheduled by DCI format 0_2. An SRS resource set list represented by RRC parameter srs-ResourceSetToAddModListDCI-0-2 can be used for DCI format 0_2 (similar to the srs-ResourceSetToAddModList used for DCI format 0_1). For codebook PUSCH, only one SRS resource set with usage set to "codebook" can be configured within srs-ResourceSetToAddModListDCI-0-2. For non-codebook PUSCH, only one SRS resource set with usage set to "noncodebook" can be configured within srs-ResourceSetToAddModListDCI-0-2.

A smaller number of SRS resources ($N_{SRS,0\_2}$) within an SRS resource set can be configured for srs-ResourceSetToAddModListDCI-0-2, which can result in smaller SRI bitwidth. The $N_{SRS,0\_2}$ SRS resources within the SRS resource set for DCI format 0_2 can be the first $N_{SRS,0\_2}$ SRS resources within the SRS resource set for DCI format 0_1. In this way, UE complexity can be prevented from increasing, since for DCI format 0_2, a subset of SRS resources in the SRS resource set configured for DCI format 0_1 can be configured.

Figure 3:
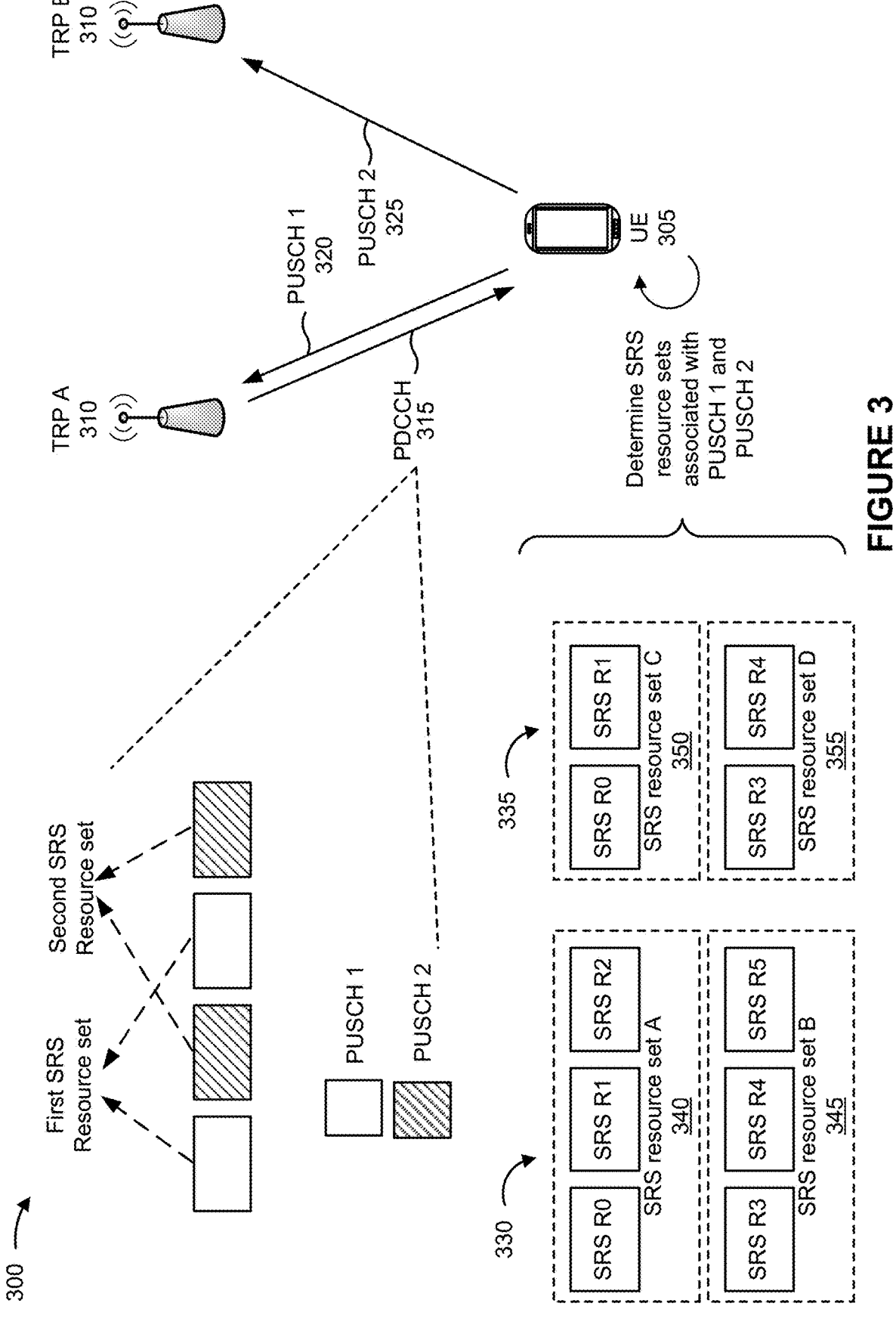
FIG. 3 is a diagram illustrating an example of multiple transmission reception point (multi-TRP or mTRP) communication in accordance with the present disclosure.

FIG. 3 is a diagram illustrating an example 300 of multi-TRP (mTRP) communication (sometimes referred to as multi-panel communication), in accordance with the present disclosure. As shown in FIG. 3, a UE 305 may communicate with multiple TRPs 310. In some aspects, a TRP 310 may be, include, or be included in, a base station 110 described above in connection with FIGS. 1 and 2. For example, different TRPs 310 may be included in different base stations 110. In some cases, multiple TRPs 310 may be included in a single base station 110. In some aspects, a base station 110 may include a control unit (CU) (for example, of an integrated access and backhaul (IAB) network) or one or more distributed units (DUs) (for example, one or more TRPs 310). In some cases, a TRP 310 may be referred to as a cell, a panel, an antenna array, or an array. The UE 305 may be, include, or be included in the UE 120 described above in connection with FIGS. 1 and 2.

In some aspects, multiple TRPs 310 may transmit communications (for example, the same communication or different communications) in the same transmission time interval (TTI) (for example, a slot, a mini-slot, a subframe, or a symbol) or different TTIs using different quasi co-location (QCL) relationships (for example, different spatial parameters, different transmission configuration indicator (TCI) states, different precoding parameters, or different beamforming parameters). In some aspects, a TCI state may be used to indicate one or more QCL relationships. A TRP 310 may be configured to individually (for example, using dynamic selection) or jointly (for example, using joint transmission with one or more other TRPs 310) serve traffic to a UE 120.

The multiple TRPs 310 (shown as TRP A and TRP B) may communicate with the same UE 305 in a coordinated manner (for example, using coordinated multipoint transmissions) to improve reliability or increase throughput. The different TRPs 310 may communicate with the UE 305 using different QCL relationships (for example, different TCI states), different DMRS ports, or different layers (for example, of a multi-layer communication).

In a multi-TRP transmission mode, one or more physical downlink control channels (PDCCHs) may be used to schedule downlink data communications for multiple corresponding PDSCHs (for example, one PDCCH for each PDSCH) or uplink data communications for multiple corresponding physical uplink shared channels (PUSCHs). In this case, for example, a PDCCH 315 transmitted by a first TRP 310 (TRP A) may schedule a first PUSCH (PUSCH 1) 320 for transmitting uplink data to the TRP A 310 and a second PUSCH (PUSCH 2) 325 for transmitting uplink data to a second TRP 310 (TRP B).

In some wireless communication standards, PUSCH transmissions may be configured as PUSCH repetitions. As used herein, the term "repetition" is used to refer to an initial communication and is also used to refer to a repeated transmission of the initial communication. For example, if the UE 305 is configured to transmit four repetitions, then the UE 305 may transmit an initial transmission and may transmit three repeated transmissions of that initial transmission. Thus, each transmission (regardless of whether the transmission is an initial transmission or a retransmission) is considered a repetition. A repetition may be transmitted in a transmission occasion, which is sometimes referred to as a transmission instance.

PUSCH repetitions can be configured by the PDCCH 315 to be transmitted using time division multiplexing (TDM), in which the PUSCH repetitions correspond to different transmission parameters (beam/spatial relation, power control, precoding). In some cases, PUSCH repetitions that are scheduled by a single DCI transmission (for example, PDCCH 315) can belong to two sets, where each set has its own transmission parameters. The two sets of PUSCH repetitions can be associated with two SRS resource sets. For example, as shown in FIG. 3, PUSCH 1 320 can refer to a first set of PUSCH repetitions and PUSCH 2 325 can refer to a second set of PUSCH repetitions. The UE 305 can transmit PUSCH 1 repetitions to TRP A 310 using a first set of PUSCH transmission parameters (for example, a first beam or a first set of power control parameters). The UE 305 can transmit PUSCH 2 repetitions to TRP B 310 using a second set of PUSCH transmission parameters (for example, a second beam or a second set of power control parameters). The first set of PUSCH repetitions (PUSCH 1) can be associated with a first SRS resource set and the second set of PUSCH repetitions (PUSCH 2) can be associated with a second SRS resource set. For example, a DCI transmission can indicate two beams and two sets of power control parameters using two corresponding SRI fields.

As shown in FIG. 3, the UE 305 determines which SRS resource sets are associated with the respective sets of PUSCH repetitions PUSCH 1 320 and PUSCH 2 325 based on SRS resource set lists. As indicated above, a first SRS resource set list (for example, srs-ResourceSetToAddModList) 330 can list one or more SRS resource sets and a second SRS resource set list (for example, srs-ResourceSetToAddModListDCI-0-2) 335 can list one or more SRS resource sets. For example, as shown, the first SRS resource set list 330 can list an SRS resource set A 340 and an SRS resource set B 345, and the second SRS resource set list 335 can list an SRS resource set C 350 and an SRS resource set D 355. The SRS resource set A 340 can include, for example, an SRS resource 0 (shown as "SRS R0"), an SRS resource 1 (shown as "SRS R0"), and an SRS resource 2 (shown as "SRS R2"). The SRS resource set B 345 can include, for example, an SRS resource 3 (shown as "SRS R3"), an SRS resource 4 (shown as "SRS R4"), and an SRS resource 5 (shown as "SRS R5"). As indicated above, SRS resource sets listed in the second SRS resource set list 335 can be subsets of SRS resource sets listed in the first SRS resource set list 330. For example, as shown, the SRS resource set C 350 can be a subset of the SRS resource set A 340 (where the SRS resource set C includes SRS R0 and SRS R1) and the SRS resource set D 355 can be a subset of the SRS resource set B 345 (where the SRS resource set D 355 includes SRS R3 and SRS R4).

To determine which SRS resource set listed in an SRS resource set list is associated with each set of PUSCH repetitions, the SRS resource set with a lower SRS resource set identifier (ID) value is the first SRS resource set (for example, the SRS resource set associated with PUSCH 1 320), and the SRS resource set with the higher SRS resource set ID is the second SRS resource set (for example, the SRS resource set associated with PUSCH 2 325). In some cases, the two SRS resource sets can have the same number of SRS resources. SRS resources to be used can be determined based on the SRS resources indicator(s). For the case of Type 1 CG PUSCH (for example, where there is no DCI transmitted or no SRI field in DCI that is transmitted), a wireless communication standard specifies two RRC parameters to be used as SRS resource indicators. A first SRS resource indicator, srs-ResourceIndicator, can be associated with the first SRS resource set (for example, the SRS resource set associated with the PUSCH 1 320) and a second SRS resource indicator, srs-ResourceIndicator2, can be associated with the second SRS resource set (for example, the SRS resource set associated with the PUSCH 2 325).

The two (first and second) SRS resource sets for mTRP PUSCH can be separately defined for DCI format 0_1 versus DCI format 0_2, and both of which can be used with RRC configured CG PUSCH. Three alternative cases may occur.

In a first case (which may be referred to as "case 1"), two SRS resource sets are configured in each of a first SRS resource set list (for example, srs-ResourceSetToAddModList) and a second SRS resource set list (for example, srs-ResourceSetToAddModListDCI-0-2). Both DCI formats 0_1 and 0_2 can schedule mTRP PUSCH (PUSCH repetitions associated with different SRS resource sets, different beams, different precoders, or different power controls, among other examples). Both DCI formats 0_1 and 0_2 have two SRI fields. The first SRS resource set for DCI format 0_2 consists of the first $N_{SRS,0\_2}$ SRS resources of the first SRS resource set for DCI format 0_1. The second SRS resource set for DCI format 0_2 consists of the first $N_{SRS,0\_2}$ SRS resources of the second SRS resource set for DCI format 0_1.

In a second case (which may be referred to as "case 2"), one SRS resource set is configured in the first SRS resource set list (for example, srs-ResourceSetToAddModList) but two SRS resource sets are configured in the second SRS resource set list (for example, srs-ResourceSetToAddModListDCI-0-2). Only DCI format 0_2 can schedule mTRP PUSCH. DCI format 0_1 can only schedule PUSCH repetitions associated with one SRS resource set. DCI format 0_2 has two SRI fields, and DCI format 0_1 has one SRI field. The first SRS resource set for DCI format 0_2 consists of the first $N_{SRS,0\_2}$ SRS resources of the SRS resource set for DCI format 0_1.

In a third case (which may be referred to as "case 3"), two SRS resource sets are configured in the first SRS resource set list (for example, srs-ResourceSetToAddModList), but one SRS resource set is configured in the second SRS resource set list (srs-ResourceSetToAddModListDCI-0-2). Only DCI format 0_1 can schedule mTRP PUSCH. DCI format 0_2 can only schedule PUSCH repetitions associated with one SRS resource set. DCI format 0_1 has two SRI fields and DCI format 0_2 has one SRI field. The SRS resource set for DCI format 0_2 consists of the first $N_{SRS,0\_2}$ SRS resources of the first SRS resource set for DCI format 0_1.

For Type 1 CG PUSCH, the UE 305 can identify PUSCH transmission parameters based on interpreting the SRS resource indicator RRC parameters (for example, srs-ResourceIndicator and, if configured, srs-ResourceIndicator2) based on the number of SRS resources in the first and second SRS resource sets, respectively. However, for the identifying PUSCH transmission parameters, it is not clear whether the SRS resource set(s) in the first SRS resource set list (for example, srs-ResourceSetToAddModList, configured for DCI format 0_1) or the SRS resource sets in the second SRS resource set (for example, srs-ResourceSetToAddModListDCI-0-2, configured for DCI format 0_2) should be used. Additionally, even though the number of SRS resources in the first and second SRS resource sets is the same, the number of SRS resources in the SRS resource set(s) for DCI format 0_2 can be smaller than the number of SRS resources in the SRS resource set(s) for DCI format 0_1, which can have an impact on the interpretation of the first SRS resource indicator (for example, srs-ResourceIndicator) and, if configured, the second SRS resource indicator (for example, srs-ResourceIndicator2) for Type 1 CG PUSCH.

For example, for Type 1 CG PUSCH, a UE can be unable to determine which SRS resource sets are to be associated with a first set of PUSCH repetitions or a second set of PUSCH repetitions. In some examples, only the first SRS resource indicator (for example, srs-ResourceIndicator) can be configured for the Type 1 CG PUSCH (for example, the second SRS resource indicator is not configured). In those situations, all PUSCH repetitions are associated with the first SRS resource set, but without an ability for the UE to determine which SRS resource set is to be considered the first SRS resource set (for example, the SRS resource set that is associated with the first set of PUSCH repetitions), the UE can be unable to determine transmission parameters for the PUSCH repetitions and, as a result, can fail to transmit the PUSCH repetitions or can transmit the PUSCH repetitions in an ineffective manner, having a negative impact on network performance.

In other examples, both the first SRS resource indicator (for example, srs-ResourceIndicator) and the second SRS resource indicator (for example, srs-ResourceIndicator2) are configured for the Type 1 CG PUSCH. In those situations, two sets of PUSCH repetitions are associated with the two SRS resource sets respectively, but without an ability for the UE to determine which SRS resource sets are to be considered the first SRS resource set (for example, the SRS resource set associated with the first set of PUSCH repetitions) and the second SRS resource set (for example, the SRS resource set associated with the second set of PUSCH repetitions), the UE can be unable to determine transmission parameters for the two sets of PUSCH repetitions and, as a result, can fail to transmit one or more of the sets of PUSCH repetitions or can transmit one or more of the sets of the PUSCH repetitions in an ineffective manner, having a negative impact on network performance.

Various aspects relate generally to interpretation of RRC configured SRS resource indicators for determining PUSCH transmission parameters for Type 1 CG PUSCH repetition. Some aspects more specifically relate to receiving a CG PUSCH configuration that includes at least one SRS resource indicator associated with at least one set of PUSCH repetitions and determining at least one set of PUSCH transmission parameters based at least in part on the at least one SRS resource indicator. In some aspects, a UE may determine at least one SRS resource set associated with at least one set of PUSCH repetitions. In some aspects, the UE may determine which SRS resources of the determined at least one SRS resource set are to be used. In some aspects, the UE may determine at least one set of PUSCH transmission parameters based at least in part on the determined SRS resources to be used.

Particular aspects of the subject matter described in this disclosure can be implemented to realize one or more of the following potential advantages. In some examples, the described techniques can be used to facilitate transmission of at least one set of PUSCH repetitions using transmission parameters associated with one or more SRS resource sets. In some examples, the described techniques can be used to facilitate mTRP Type 1 CG PUSCH repetition, thereby having a positive impact on network performance.

Figure 4:
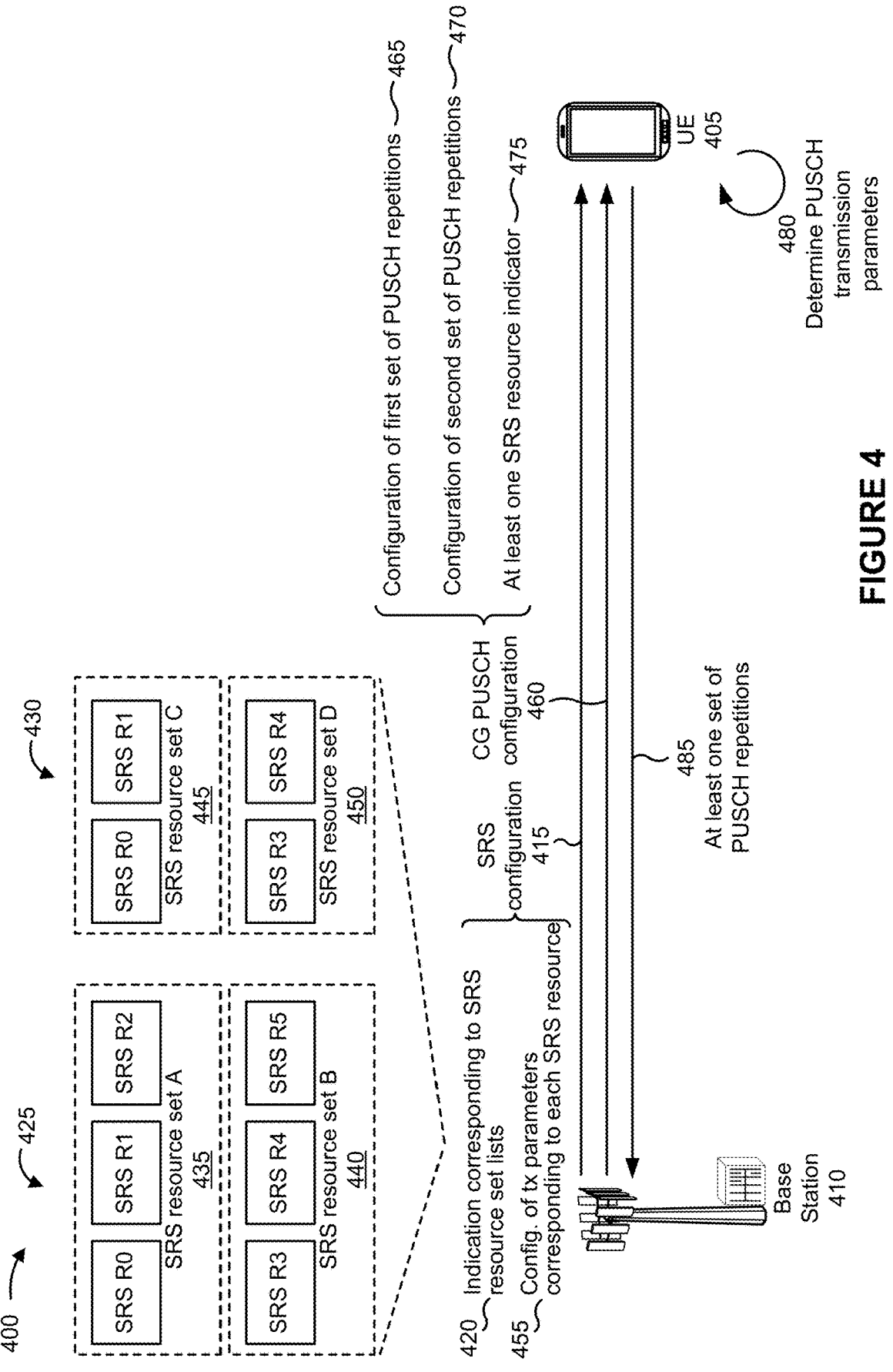
FIG. 4 is a diagram illustrating an example associated with sounding reference signal (SRS) resource indicators associated with configured grant (CG) physical uplink shared channel (PUSCH) repetition in accordance with the present disclosure.

FIG. 4 is a diagram illustrating an example 400 associated with SRS resource indicators associated with CG PUSCH repetition, in accordance with the present disclosure. As shown in FIG. 4, a UE 405 and a base station 410 may communicate with one another. For example, the UE 405 may be, or be similar to, the UE 120 depicted in FIGS. 1 and 2. The base station 410 may be, or be similar to, the base station 110 depicted in FIGS. 1 and 2.

In a first operation 415, the base station 410 may transmit, and the UE 405 may receive, an SRS configuration. In some aspects, the base station 410 may transmit the SRS configuration by transmitting an RRC message containing the SRS configuration. The SRS configuration may configure one or more SRS resources, which may be organized into SRS resource sets, as explained above. In some aspects, as shown, the SRS configuration may include an indication 420 corresponding to SRS resource set lists. For example, the indication 420 may include an indication of a number of SRS resource sets listed in a first SRS resource set list 425 or a number of SRS resource sets listed in a second SRS resource set list 430. In the illustrated example, the indication 420 may indicate that the first SRS resource set list 425 lists SRS resource set A 435 and SRS resource set B 440 and that the second SRS resource set list 430 lists SRS resource set C 445 and SRS resource set D 450. The SRS configuration also may include a configuration 455 of at least one set of transmission parameters corresponding to each SRS resource (for example, SRS R0, SRS R1, SRS R2, SRS R3, SRS R4, and SRS R5) included in the listed SRS resource sets. In some aspects, at least one SRS resource set listed in the second SRS resource set list 430 may be a subset of a corresponding SRS resource set listed in the first SRS resource set list 425.

In a second operation 460, the base station 410 may transmit, and the UE 405 may receive, a CG PUSCH configuration. The CG PUSCH configuration may be a Type 1 CG PUSCH configuration (in which all PUSCH repetition parameters are configured by RRC messages). In some aspects, the base station 410 may transmit the CG PUSCH configuration by transmitting an RRC message containing the SRS configuration. In some aspects, the CG PUSCH configuration may include a configuration 465 of a first set of PUSCH repetitions. In some aspects, the configuration 465 may indicate that the first set of PUSCH repetitions is associated with a first SRS resource set. The CG PUSCH configuration also may include a configuration 470 of a second set of PUSCH repetitions. The configuration 470 may indicate that the second set of PUSCH repetitions is associated with a second SRS resource set.

The CG PUSCH configuration also may include at least one SRS resource indicator 475. The at least one SRS resource indicator may be associated with at least one set of PUSCH repetitions and may indicate at least one SRS resource corresponding to at least one SRS resource set. The at least one SRS resource set may be listed in at least one of the first SRS resource set list 425 or the second SRS resource set list 430. For example, the at least one SRS resource indicator 475 may include a first SRS resource indicator (for example, srs-ResourceIndicator) that indicates which SRS resources of the first SRS resource set (the SRS resource set associated with the first set of PUSCH repetitions) are to be used. The at least one SRS resource indicator 475 may include a second SRS resource indicator (for example, srs-ResourceIndicator2) that indicates which SRS resources of the second SRS resource set (the SRS resource set associated with the second set of PUSCH repetitions) are to be used.

In a third operation 480, the UE 405 may determine at least one set of PUSCH transmission parameters for the at least one set of PUSCH repetitions. The UE 405 may determine the at least one set of PUSCH transmission parameters based at least in part on a determination of the at least one SRS resource set. In some aspects, for example, the UE 405 may determine the at least one set of PUSCH transmission parameters based at least in part on determining at least one SRS resource set. The UE 405 may determine the at least one SRS resource set based at least in part on determining which configured SRS resource sets correspond to the first or second SRS resource sets, respectively. In the illustrated example, the UE 405 may determine that the first SRS Resource set (for example, the SRS resource set associated with the first set of PUSCH repetitions) is Resource Set A and that the second SRS Resource set (for example, the SRS resource set associated with the second set of PUSCH repetitions) is Resource Set B.

According to aspects described herein, the UE 405 may determine the at least one SRS resource set in accordance with one or more rules specified in a wireless communication standard. For example, the one or more rules may be categorized according to a first case in which only a first SRS resource indicator (for example, srs-ResourceIndicator) is configured for the Type 1 CG PUSCH, or a second case in which a first SRS resource indicator (for example, srs-ResourceIndicator) and a second SRS resource indicator (for example, srs-ResourceIndicator2) are configured for the Type 1 CG PUSCH. In the first case, all PUSCH repetitions are associated with one SRS resource set and in the second case, a first set of PUSCH repetitions are associated with a first SRS resource set and a second set of PUSCH repetitions are associated with a second SRS resource set.

In the first case, the least one SRS resource indicator 475 may include only one SRS resource indicator, and the at least one SRS resource set may include only one SRS resource set. In some aspects, according to the one or more rules, the UE 405 may determine the at least one SRS resource set to be a first SRS resource set (for example, SRS resource set A 435) listed in the first SRS resource set list 425, having a usage indicator set to codebook or non-codebook, based at least in part on the only one SRS resource set comprising the first SRS resource set listed in the first SRS resource set list 425. In some aspects, the first SRS resource set may be the only SRS resource set listed in the first SRS resource set list 425. In some other aspects, the first SRS resource set listed in the first SRS resource set list 425 may include an SRS resource set having a lower SRS resource set identifier (ID) value than any other SRS resource set ID value associated with any other SRS resource set listed in the first SRS resource set list 425. For example, the SRS resource set ID associated with SRS resource set A 435 may have a lower value than an SRS resource set ID associated SRS resource set B 440.

In some aspects, according to the one or more rules, the UE 405 may determine the at least one SRS resource set to be a first SRS resource set (for example, SRS resource set C 445) listed in the second SRS resource set list 430, having a usage indicator set to codebook or non-codebook, based at least in part on the only one SRS resource set comprising a first SRS resource set listed in the second SRS resource set list 430. In some aspects, the first SRS resource set listed in the second SRS resource set list 430 may be the only SRS resource set listed in the second SRS resource set list 430.

In some other aspects, the first SRS resource set listed in the second SRS resource set list 430 may include an SRS resource set having a lower SRS resource set ID value than any other SRS resource set ID value associated with any other SRS resource set listed in the second SRS resource set list 430.

In some aspects, according to the one or more rules, the CG PUSCH configuration may include an indicator bit, and the UE 405 may determine the at least one SRS resource set to be the only one SRS resource set, wherein the only one SRS resource set includes a first SRS resource set listed in the first SRS resource set list 425 based at least in part on the indicator bit having a first value, or a first SRS resource set listed in the second SRS resource set list 430 based at least in part on the indicator bit having a second value. In some aspects, the UE 405 may determine the at least one SRS resource set to be an SRS resource set associated with an SRS resource set ID, associated with the only one SRS resource set, based at least in part on an explicit indicator, associated with an uplink grant parameter of the CG PUSCH configuration, indicating the SRS resource set ID.

In the second case introduced above for categorization of the one or more rules, the least one SRS resource indicator 475 may include a first SRS resource indicator and a second SRS resource indicator. The at least one set of PUSCH repetitions may include a first set of PUSCH repetitions associated with a first SRS resource set and a second set of PUSCH repetitions associated with a second SRS resource set, and the first SRS resource set and the second SRS resource set may be listed in the at least one of the first SRS resource set list 425 or the second SRS resource set list 430.

In some aspects, according to the one or more rules, the UE 405 may determine the at least one SRS resource set based at least in part on determining that the first SRS resource set includes a first SRS resource set (for example, SRS resource set A 435) listed in the first SRS resource set list 425 and having a first usage indicator set to codebook or non-codebook, and determining that the second SRS resource set includes a second SRS resource set (SRS resource set B 440) listed in the first SRS resource set list 425 and having a second usage indicator set to codebook or non-codebook. In some aspects, the UE 405 may determine the at least one SRS resource set based at least in part on the first SRS resource set list 425 listing the second SRS resource set. In some other aspects, the UE 405 may determine the at least one SRS resource set based at least in part on the first SRS resource set list 425 listing only the first SRS resource set. For example, the first SRS resource indicator (for example, srs-ResourceIndicator) may be associated with the first SRS resource set in the first SRS resource set list 425, and if the first SRS resource set list 425 lists a second SRS resource set, the second SRS resource indicator (for example, srs-ResourceIndicator2) may be associated with the second SRS resource set in the first SRS resource set list 425. If the first SRS resource set list 425 lists only one SRS resource set, then the second SRS resource indicator may be associated with the second SRS resource set in the second SRS resource set list 430.

In some aspects, according to the one or more rules, the first and second SRS resource sets may both be from the first SRS resource set list 425 or both from the second SRS resource set list 430. For example, the UE 405 may determine the at least one SRS resource set based at least in part on determining that the first SRS resource set includes a first SRS resource set listed in the second SRS resource set list 430 and having a first usage indicator set to codebook or non-codebook, and determining that the second SRS resource set includes a second SRS resource set listed in the second SRS resource set list 430 and having a second usage indicator set to codebook or non-codebook. In some other aspects, the UE 405 may determine the at least one SRS resource set based at least in part on the second SRS resource set list 430 listing both the first SRS resource set and the second SRS resource set.

In some other aspects, the CG PUSCH configuration may include an indicator bit, and the UE 405 may determine the at least one SRS resource set based at least in part on determining the first SRS resource set to be a first SRS resource set listed in the first SRS resource set list 425 based at least in part on the indicator bit having a first value, or determining the first SRS resource set to be a first SRS resource set listed in the second SRS resource set list 430 based at least in part on the indicator bit having a second value. In some aspects, the CG PUSCH configuration may include an indicator bit, and the UE 405 may determine the at least one SRS resource based at least in part on determining the second SRS resource set to be a second SRS resource set listed in the first SRS resource set list 425 based at least in part on the indicator bit having a first value, or determining the second SRS resource set to be a second SRS resource set listed in the second SRS resource set list 430 based at least in part on the indicator bit having a second value.

In some aspects, a first SRS resource set ID may correspond to the first SRS resource set and a second SRS resource set ID may correspond to the second SRS resource set. In some aspects, according to the one or more rules, the UE 405 may determine the at least one SRS resource set to include a first SRS resource set associated with a first SRS resource set ID and a second SRS resource set associated with a second SRS resource set ID. In some aspects, the UE 405 may determine the at least one SRS resource set based at least in part on an explicit indicator, associated with an uplink grant parameter of the CG PUSCH configuration, indicating the first SRS resource set ID and the second SRS resource set ID.

The third operation 480 also may include determining that the at least one SRS resource indicator 475 indicates which SRS resources of the at least one SRS resource set that the UE 405 is to use to determine PUSCH transmission parameters. In some aspects, the UE 405 may determine the SRS resources to use based at least in part on one or more SRI tables specified by a wireless communication standard (for example, Table 1 or Table 2, above). The third operation 480 also may include determining the at least one PUSCH transmission parameter based at least in part on the SRS configuration of the determined SRS resources.

In a fourth operation 485, the UE 405 may transmit, and the base station 410 may receive, at least one set of PUSCH repetitions. The UE 405 may transmit the at least one set of PUSCH repetitions using the at least one set of PUSCH transmission parameters determined as described above. For example, in some aspects, the UE 405 may transmit a first set of PUSCH repetitions using a first set of PUSCH transmission parameters and a second set of PUSCH repetitions using a second set of PUSCH transmission parameters.

FIG. 5 is a flowchart illustrating an example process 500 performed, for example, by a UE in accordance with the present disclosure. Example process 500 is an example where the UE (for example, UE 405) performs operations associated with SRS resource indicators associated with CG PUSCH repetition.

As shown in FIG. 5, in some aspects, process 500 may include receiving a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list (block 510). For example, the UE (such as by using communication manager 140 or reception component 702, depicted in FIG. 7) may receive a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list, as described above.

As further shown in FIG. 5, in some aspects, process 500 may include determining at least one set of PUSCH transmission parameters for the at least one set of PUSCH repetitions based at least in part on a determination of the at least one SRS resource set (block 520). For example, the UE (such as by using communication manager 140 or determination component 708, depicted in FIG. 7) may determine at least one set of PUSCH transmission parameters for the at least one set of PUSCH repetitions based at least in part on a determination of the at least one SRS resource set, as described above.

As further shown in FIG. 5, in some aspects, process 500 may include transmitting the at least one set of PUSCH repetitions based at least in part on the at least one set of PUSCH transmission parameters (block 530). For example, the UE (such as by using communication manager 140 or transmission component 704, depicted in FIG. 7) may transmit the at least one set of PUSCH repetitions based at least in part on the at least one set of PUSCH transmission parameters, as described above.

Process 500 may include additional aspects, such as any single aspect or any combination of aspects described below or in connection with one or more other processes described elsewhere herein.

In a first additional aspect, the least one SRS resource indicator includes only one SRS resource indicator, and the at least one SRS resource set includes only one SRS resource set.

In a second additional aspect, alone or in combination with the first aspect, process 500 includes determining the at least one SRS resource set to be a first SRS resource set listed in the first SRS resource set list, having a usage indicator set to codebook or non-codebook, based at least in part on the only one SRS resource set comprising the first SRS resource set listed in the first SRS resource set list.

In a third additional aspect, alone or in combination with the second aspect, the first SRS resource set is the only SRS resource set listed in the first SRS resource set list.

In a fourth additional aspect, alone or in combination with one or more of the second through third aspects, the first SRS resource set listed in the first SRS resource set list comprises an SRS resource set having a lower SRS resource set ID value than any other SRS resource set ID value associated with any other SRS resource set listed in the first SRS resource set list.

In a fifth additional aspect, alone or in combination with one or more of the first through fourth aspects, process 500 includes determining the at least one SRS resource set to be a first SRS resource set listed in the second SRS resource set list, having a usage indicator set to codebook or non-codebook, based at least in part on the only one SRS resource set comprising a first SRS resource set listed in the second SRS resource set list.

In a sixth additional aspect, alone or in combination with the fifth aspect, the first SRS resource set listed in the second SRS resource set list is the only SRS resource set listed in the second SRS resource set list.

In a seventh additional aspect, alone or in combination with one or more of the fifth through sixth aspects, the first SRS resource set listed in the second SRS resource set list comprises an SRS resource set having a lower SRS resource set ID value than any other SRS resource set ID value associated with any other SRS resource set listed in the second SRS resource set list.

In an eighth additional aspect, alone or in combination with the first aspect, the CG PUSCH configuration includes an indicator bit, and process 500 includes determining the at least one SRS resource set to be the only one SRS resource set, wherein the only one SRS resource set comprises a first SRS resource set listed in the first SRS resource set list based at least in part on the indicator bit having a first value, or a first SRS resource set listed in the second SRS resource set list based at least in part on the indicator bit having a second value.

In a ninth additional aspect, alone or in combination with the first aspect, process 500 includes determining the at least one SRS resource set to be an SRS resource set associated with an SRS resource set ID, associated with the only one SRS resource set, based at least in part on an explicit indicator, associated with an uplink grant parameter of the CG PUSCH configuration, indicating the SRS resource set ID.

In a tenth additional aspect, the least one SRS resource indicator includes a first SRS resource indicator and a second SRS resource indicator, wherein the at least one set of PUSCH repetitions comprises a first set of PUSCH repetitions associated with a first SRS resource set and a second set of PUSCH repetitions associated with a second SRS resource set, and wherein the first SRS resource set and the second SRS resource set are listed in the at least one of the first SRS resource set list or the second SRS resource set list.

In an eleventh additional aspect, alone or in combination with the tenth aspect, process 500 includes determining the at least one SRS resource set, wherein determining the at least one SRS resource set comprises determining that the first SRS resource set comprises a first SRS resource set listed in the first SRS resource set list and having a first usage indicator set to codebook or non-codebook, and determining that the second SRS resource set comprises a second SRS resource set listed in the first SRS resource set list and having a second usage indicator set to codebook or non-codebook.

In a twelfth additional aspect, alone or in combination with the eleventh aspect, determining the at least one SRS resource set comprises determining the at least one SRS resource set based at least in part on the first SRS resource set list listing the second SRS resource set.

In a thirteenth additional aspect, alone or in combination with the eleventh aspect, determining the at least one SRS resource set comprises determining the at least one SRS resource set based at least in part on the first SRS resource set list listing only the first SRS resource set.

In a fourteenth additional aspect, alone or in combination with the tenth aspect, process 500 includes determining the at least one SRS resource set, wherein determining the at least one SRS resource set comprises determining that the first SRS resource set comprises a first SRS resource set listed in the second SRS resource set list and having a first usage indicator set to codebook or non-codebook, and determining that the second SRS resource set comprises a second SRS resource set listed in the second SRS resource set list and having a second usage indicator set to codebook or non-codebook.

In a fifteenth additional aspect, alone or in combination with the tenth aspect, determining the at least one SRS resource set comprises determining the at least one SRS resource set based at least in part on the second SRS resource set list listing the first SRS resource set and the second SRS resource set.

In a sixteenth additional aspect, alone or in combination with the tenth aspect, the CG PUSCH configuration includes an indicator bit, and process 500 includes determining the first SRS resource set to be a first SRS resource set listed in the first SRS resource set list based at least in part on the indicator bit having a first value, or determining the first SRS resource set to be a first SRS resource set listed in the second SRS resource set list based at least in part on the indicator bit having a second value.

In a seventeenth additional aspect, alone or in combination with one or more of the tenth or sixteenth aspects, the CG PUSCH configuration includes an indicator bit, and process 500 includes determining the second SRS resource set to be a second SRS resource set listed in the first SRS resource set list based at least in part on the indicator bit having a first value, or determining the second SRS resource set to be a second SRS resource set listed in the second SRS resource set list based at least in part on the indicator bit having a second value.

In an eighteenth additional aspect, alone or in combination with the tenth aspect, a first SRS resource set ID corresponds to the first SRS resource set and a second SRS resource set ID corresponds to the second SRS resource set, and process 500 includes determining the at least one SRS resource set to include a first SRS resource set associated with a first SRS resource set ID and a second SRS resource set associated with a second SRS resource set ID, wherein determining the at least one SRS resource set comprises determining the at least one SRS resource set based at least in part on an explicit indicator, associated with an uplink grant parameter of the CG PUSCH configuration, indicating the first SRS resource set ID and the second SRS resource set ID.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

FIG. 6 is a flowchart illustrating an example process 600 performed, for example, by a base station in accordance with the present disclosure. Example process 600 is an example where the base station (for example, base station 410) performs operations associated with SRS resource indicators associated with CG PUSCH repetition.

As shown in FIG. 6, in some aspects, process 600 may include transmitting a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list (block 610). For example, the base station (such as by using communication manager 150 or transmission component 804, depicted in FIG. 8) may transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list, as described above.

As further shown in FIG. 6, in some aspects, process 600 may include receiving the at least one set of PUSCH repetitions based at least in part on at least one set of PUSCH transmission parameters, wherein the at least one set of PUSCH transmission parameters is based at least in part on a determination of the at least one resource set (block 620). For example, the base station (such as by using communication manager 150 or reception component 802, depicted in FIG. 8) may receive the at least one set of PUSCH repetitions based at least in part on at least one set of PUSCH transmission parameters, wherein the at least one set of PUSCH transmission parameters is based at least in part on a determination of the at least one resource set, as described above.

Process 600 may include additional aspects, such as any single aspect or any combination of aspects described below or in connection with one or more other processes described elsewhere herein.

In a first additional aspect, the least one SRS resource indicator includes only one SRS resource indicator, and the at least one SRS resource set includes only one SRS resource set.

In a second additional aspect, alone or in combination with the first aspect, the at least one SRS resource set is a first SRS resource set listed in the first SRS resource set list, having a usage indicator set to codebook or non-codebook, based at least in part on the only one SRS resource set comprising the first SRS resource set listed in the first SRS resource set list.

In a third additional aspect, alone or in combination with the second aspect, the first SRS resource set is the only SRS resource set listed in the first SRS resource set list.

In a fourth additional aspect, alone or in combination with one or more of the second through third aspects, the first SRS resource set listed in the first SRS resource set list comprises an SRS resource set having a lower SRS resource set ID value than any other SRS resource set ID value associated with any other SRS resource set listed in the first SRS resource set list.

In a fifth additional aspect, alone or in combination with the first aspect, the at least one SRS resource set is a first SRS resource set listed in the second SRS resource set list, having a usage indicator set to codebook or non-codebook, based at least in part on the only one SRS resource set comprising a first SRS resource set listed in the second SRS resource set list.

In a sixth additional aspect, alone or in combination with the fifth aspect, the first SRS resource set listed in the second SRS resource set list is the only SRS resource set listed in the second SRS resource set list.

In a seventh additional aspect, alone or in combination with one or more of the fifth through sixth aspects, the first SRS resource set listed in the first SRS resource set list comprises an SRS resource set having a lower SRS resource set ID value than any other SRS resource set ID value associated with any other SRS resource set listed in the second SRS resource set list.

In an eighth additional aspect, alone or in combination with the first aspect, the CG PUSCH configuration includes an indicator bit, wherein the at least one SRS resource set is the only one SRS resource set, and the only one SRS resource set comprises a first SRS resource set listed in the second SRS resource set list based at least in part on the indicator bit having a first value, or a first SRS resource set listed in the second SRS resource set list based at least in part on the indicator bit having a second value.

In a ninth additional aspect, alone or in combination with the first aspect, the at least one SRS resource set is an SRS resource set associated with an SRS resource set ID, associated with the only one SRS resource set, based at least in part on an explicit indicator, associated with an uplink grant parameter of the CG PUSCH configuration, indicating the SRS resource set ID.

In a tenth additional aspect, the least one SRS resource indicator includes a first SRS resource indicator and a second SRS resource indicator, wherein the at least one set of PUSCH repetitions comprises a first set of PUSCH repetitions associated with a first SRS resource set and a second set of PUSCH repetitions associated with a second SRS resource set, and wherein the first SRS resource set and the second SRS resource set are listed in the at least one of the first SRS resource set list or the second SRS resource set list.

In an eleventh additional aspect, alone or in combination with the tenth aspect, the determination of the at least one SRS resource set comprises a determination that the first SRS resource set comprises a first SRS resource set listed in the first SRS resource set list and having a first usage indicator set to codebook or non-codebook, and the second SRS resource set comprises a second SRS resource set listed in the first SRS resource set list and having a second usage indicator set to codebook or non-codebook.

In a twelfth additional aspect, alone or in combination with the eleventh aspect, the determination of the at least one SRS resource set is based at least in part on the first SRS resource set list listing the second SRS resource set.

In a thirteenth additional aspect, alone or in combination with the eleventh aspect, the determination of the at least one SRS resource set is based at least in part on the first SRS resource set list listing only the first SRS resource set.

In a fourteenth additional aspect, alone or in combination with the tenth aspect, the determination of the at least one SRS resource set comprises a determination that the first SRS resource set comprises a first SRS resource set listed in the second SRS resource set list and having a first usage indicator set to codebook or non-codebook, and a determination that the second SRS resource set comprises a second SRS resource set listed in the second SRS resource set list and having a second usage indicator set to codebook or non-codebook.

In a fifteenth additional aspect, alone or in combination with the eleventh aspect, the determination of the at least one SRS resource set is based at least in part on the second SRS resource set list listing the first SRS resource set and the second SRS resource set.

In a sixteenth additional aspect, alone or in combination with the eleventh aspect, the CG PUSCH configuration includes an indicator bit, and the determination of the at least one SRS resource set comprises a determination that the first SRS resource set is a first SRS resource set listed in the first SRS resource set list based at least in part on the indicator bit having a first value, or a determination that the first SRS resource set is a first SRS resource set listed in the second SRS resource set list based at least in part on the indicator bit having a second value.

In a seventeenth additional aspect, alone or in combination with the eleventh aspect, the CG PUSCH configuration includes an indicator bit, and the determination of the at least one SRS resource set comprises a determination that the second SRS resource set is a second SRS resource set listed in the first SRS resource set list based at least in part on the indicator bit having a first value, or a determination that the second SRS resource set is a second SRS resource set listed in the second SRS resource set list based at least in part on the indicator bit having a second value.

In an eighteenth additional aspect, alone or in combination with the eleventh aspect, a first SRS resource set ID corresponds to the first SRS resource set and a second SRS resource set ID corresponds to the second SRS resource set, wherein the determination of the at least one SRS resource set comprises a determination that the at least one SRS resource set includes a first SRS resource set associated with a first SRS resource set ID and a second SRS resource set associated with a second SRS resource set ID, wherein the determination of the at least one SRS resource set is based at least in part on an explicit indicator, associated with an uplink grant parameter of the CG PUSCH configuration, indicating the first SRS resource set ID and the second SRS resource set ID.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
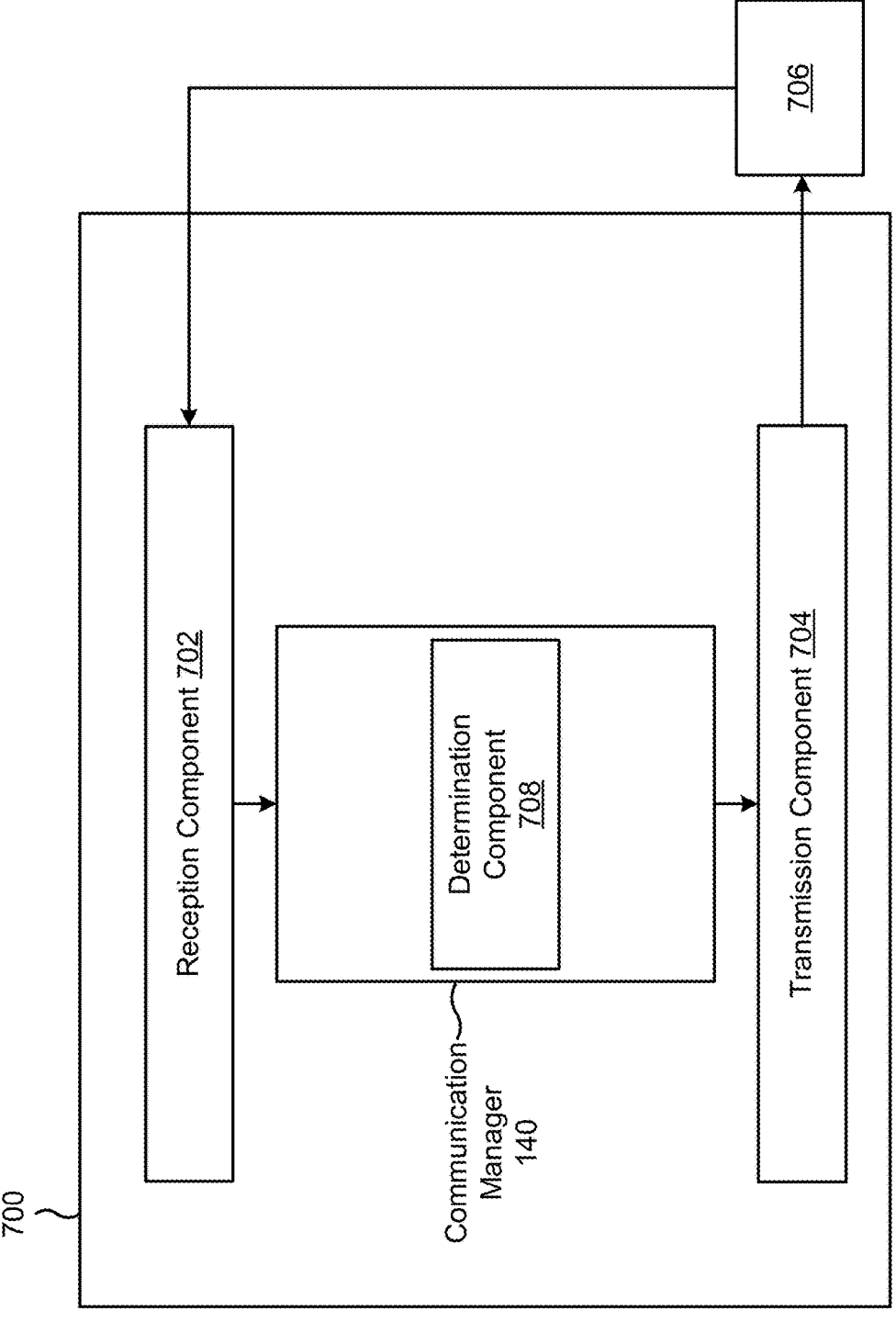
FIGS. 7 and 8 are diagrams of example apparatuses for wireless communication that support SRS resource indicators associated with CG PUSCH repetition in accordance with the present disclosure.

FIG. 7 is a diagram of an example apparatus 700 for wireless communication in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 4. Additionally or alternatively, the apparatus 700 may be configured to perform one or more processes described herein, such as process 500 of FIG. 5. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may receive or may cause the reception component 702 to receive a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The communication manager 140 may determine at least one set of PUSCH transmission parameters for the at least one set of PUSCH repetitions based at least in part on a determination of the at least one SRS resource set. The communication manager 140 may transmit or may cause the transmission component 704 to transmit the at least one set of PUSCH repetitions based at least in part on the at least one set of PUSCH transmission parameters. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a determination component 708. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The determination component 708 may determine at least one set of PUSCH transmission parameters for the at least one set of PUSCH repetitions based at least in part on a determination of the at least one SRS resource set. The transmission component 704 may transmit the at least one set of PUSCH repetitions based at least in part on the at least one set of PUSCH transmission parameters.

The determination component 708 may determine the at least one SRS resource set to be a first SRS resource set listed in the first SRS resource set list, having a usage indicator set to codebook or non-codebook, based at least in part on the only one SRS resource set comprising the first SRS resource set listed in the first SRS resource set list.

The determination component 708 may determine the at least one SRS resource set to be a first SRS resource set listed in the second SRS resource set list, having a usage indicator set to codebook or non-codebook, based at least in part on the only one SRS resource set comprising a first SRS resource set listed in the second SRS resource set list.

The determination component 708 may determine the at least one SRS resource set to be an SRS resource set associated with an SRS resource set ID, associated with the only one SRS resource set, based at least in part on an explicit indicator, associated with an uplink grant parameter of the CG PUSCH configuration, indicating the SRS resource set ID.

The determination component 708 may determine the at least one SRS resource set, wherein determining the at least one SRS resource set comprises determining that the first SRS resource set comprises a first SRS resource set listed in the first SRS resource set list and having a first usage indicator set to codebook or non-codebook; and determining that the second SRS resource set comprises a second SRS resource set listed in the first SRS resource set list and having a second usage indicator set to codebook or non-codebook.

The determination component 708 may determine the at least one SRS resource set, wherein determining the at least one SRS resource set comprises determining that the first SRS resource set comprises a first SRS resource set listed in the second SRS resource set list and having a first usage indicator set to codebook or non-codebook; and determining that the second SRS resource set comprises a second SRS resource set listed in the second SRS resource set list and having a second usage indicator set to codebook or non-codebook.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
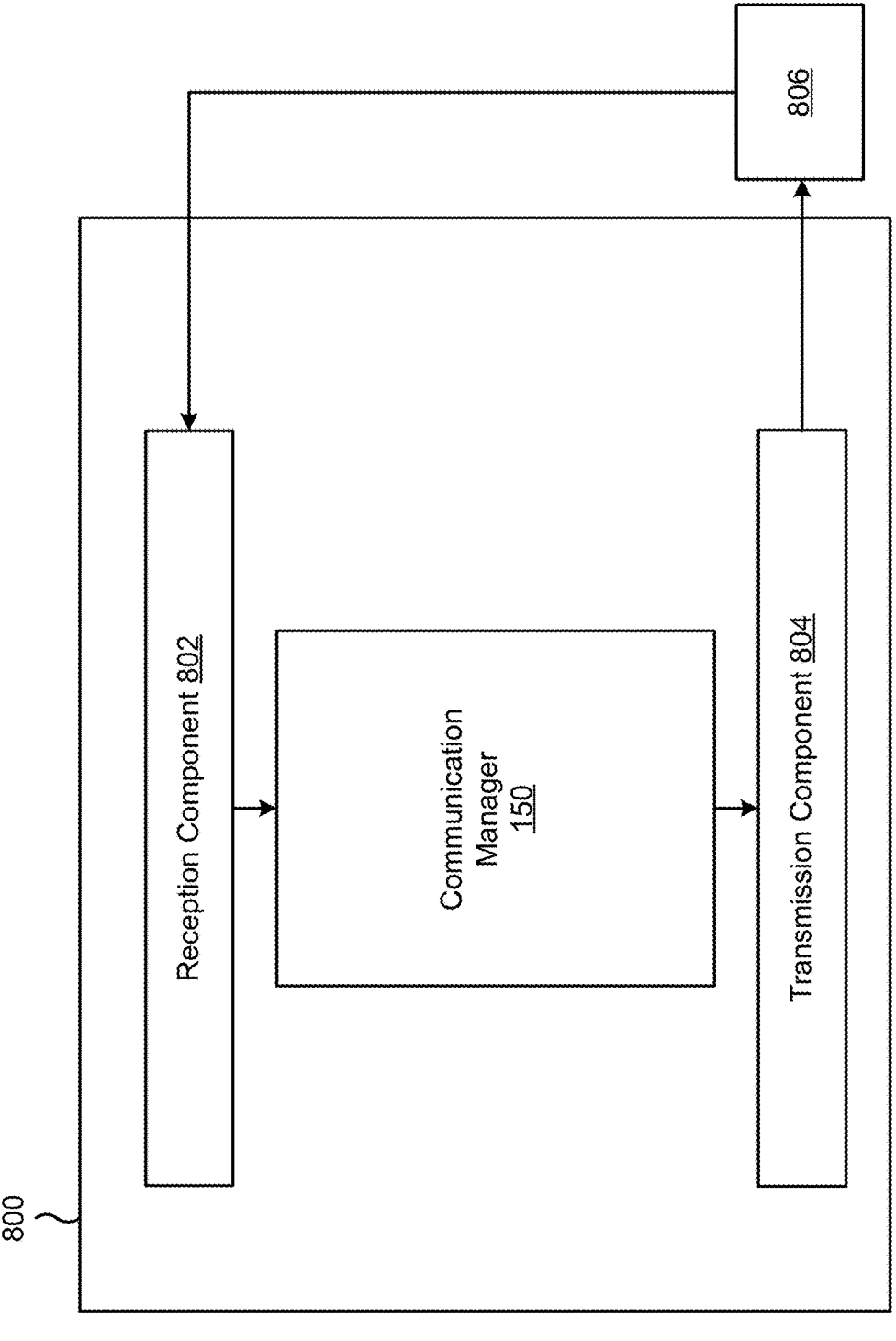

FIG. 8 is a diagram of an example apparatus 800 for wireless communication in accordance with the present disclosure. The apparatus 800 may be a base station, or a base station may include the apparatus 800. In some aspects, the apparatus 800 includes a reception component 802, a transmission component 804, and a communication manager 150, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 4. Additionally or alternatively, the apparatus 800 may be configured to perform one or more processes described herein, such as process 600 of FIG. 6. In some aspects, the apparatus 800 may include one or more components of the base station described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 150. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, the communication manager 150 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The communication manager 150 may transmit or may cause the transmission component 804 to transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The communication manager 150 may receive or may cause the reception component 802 to receive the at least one set of PUSCH repetitions based at least in part on at least one set of PUSCH transmission parameters, wherein the at least one set of PUSCH transmission parameters is based at least in part on a determination of the at least one resource set. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, one or more components of a set of components of the communication manager 150 may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 804 may transmit a CG PUSCH configuration comprising at least one SRS resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list. The reception component 802 may receive the at least one set of PUSCH repetitions based at least in part on at least one set of PUSCH transmission parameters, wherein the at least one set of PUSCH transmission parameters is based at least in part on a determination of the at least one resource set.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a configured grant (CG) physical uplink shared channel (PUSCH) configuration comprising at least one sounding reference signal (SRS) resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list; determining at least one set of PUSCH transmission parameters for the at least one set of PUSCH repetitions based at least in part on a determination of the at least one SRS resource set; and transmitting the at least one set of PUSCH repetitions based at least in part on the at least one set of PUSCH transmission parameters.

Aspect 2: The method of Aspect 1, wherein the least one SRS resource indicator includes only one SRS resource indicator, and wherein the at least one SRS resource set includes only one SRS resource set.

Aspect 3: The method of Aspect 2, further comprising determining the at least one SRS resource set to be a first SRS resource set listed in the first SRS resource set list, having a usage indicator set to codebook or non-codebook, based at least in part on the only one SRS resource set comprising the first SRS resource set listed in the first SRS resource set list.

Aspect 4: The method of Aspect 3, wherein the first SRS resource set is the only SRS resource set listed in the first SRS resource set list.

Aspect 5: The method of either of Aspects 3 or 4, wherein the first SRS resource set listed in the first SRS resource set list comprises an SRS resource set having a lower SRS resource set identifier (ID) value than any other SRS resource set ID value associated with any other SRS resource set listed in the first SRS resource set list.

Aspect 6: The method of any of Aspects 2-5, further comprising determining the at least one SRS resource set to be a first SRS resource set listed in the second SRS resource set list, having a usage indicator set to codebook or non-codebook, based at least in part on the only one SRS resource set comprising a first SRS resource set listed in the second SRS resource set list.

Aspect 7: The method of Aspect 6, wherein the first SRS resource set listed in the second SRS resource set list is the only SRS resource set listed in the second SRS resource set list.

Aspect 8: The method of either of Aspects 6 or 7, wherein the first SRS resource set listed in the second SRS resource set list comprises an SRS resource set having a lower SRS resource set identifier (ID) value than any other SRS resource set ID value associated with any other SRS resource set listed in the second SRS resource set list.

Aspect 9: The method of Aspect 2, wherein the CG PUSCH configuration includes an indicator bit, the method further comprising determining the at least one SRS resource set to be the only one SRS resource set, wherein the only one SRS resource set comprises: a first SRS resource set listed in the first SRS resource set list based at least in part on the indicator bit having a first value, or a first SRS resource set listed in the second SRS resource set list based at least in part on the indicator bit having a second value.

Aspect 10: The method of Aspect 2, further comprising determining the at least one SRS resource set to be an SRS resource set associated with an SRS resource set identifier (ID), associated with the only one SRS resource set, based at least in part on an explicit indicator, associated with an uplink grant parameter of the CG PUSCH configuration, indicating the SRS resource set ID.

Aspect 11: The method of Aspect 1, wherein the least one SRS resource indicator includes a first SRS resource indicator and a second SRS resource indicator, wherein the at least one set of PUSCH repetitions comprises a first set of PUSCH repetitions associated with a first SRS resource set and a second set of PUSCH repetitions associated with a second SRS resource set, and wherein the first SRS resource set and the second SRS resource set are listed in the at least one of the first SRS resource set list or the second SRS resource set list.

Aspect 12: The method of Aspect 11, further comprising determining the at least one SRS resource set, wherein determining the at least one SRS resource set comprises: determining that the first SRS resource set comprises a first SRS resource set listed in the first SRS resource set list and having a first usage indicator set to codebook or non-codebook; and determining that the second SRS resource set comprises a second SRS resource set listed in the first SRS resource set list and having a second usage indicator set to codebook or non-codebook.

Aspect 13: The method of Aspect 12, wherein determining the at least one SRS resource set comprises determining the at least one SRS resource set based at least in part on the first SRS resource set list listing the second SRS resource set.

Aspect 14: The method of Aspect 12, wherein determining the at least one SRS resource set comprises determining the at least one SRS resource set based at least in part on the first SRS resource set list listing only the first SRS resource set.

Aspect 15: The method of Aspect 11, further comprising determining the at least one SRS resource set, wherein determining the at least one SRS resource set comprises: determining that the first SRS resource set comprises a first SRS resource set listed in the second SRS resource set list and having a first usage indicator set to codebook or non-codebook; and determining that the second SRS resource set comprises a second SRS resource set listed in the second SRS resource set list and having a second usage indicator set to codebook or non-codebook.

Aspect 16: The method of Aspect 11, wherein determining the at least one SRS resource set comprises determining the at least one SRS resource set based at least in part on the second SRS resource set list listing the first SRS resource set and the second SRS resource set.

Aspect 17: The method of Aspect 11, wherein the CG PUSCH configuration includes an indicator bit, the method further comprising: determining the first SRS resource set to be a first SRS resource set listed in the first SRS resource set list based at least in part on the indicator bit having a first value, or determining the first SRS resource set to be a first SRS resource set listed in the second SRS resource set list based at least in part on the indicator bit having a second value.

Aspect 18: The method of either of Aspects 11 or 17, wherein the CG PUSCH configuration includes an indicator bit, the method further comprising: determining the second SRS resource set to be a second SRS resource set listed in the first SRS resource set list based at least in part on the indicator bit having a first value, or determining the second SRS resource set to be a second SRS resource set listed in the second SRS resource set list based at least in part on the indicator bit having a second value.

Aspect 19: The method of Aspect 11, wherein a first SRS resource set identifier (ID) corresponds to the first SRS resource set and a second SRS resource set ID corresponds to the second SRS resource set, further comprising determining the at least one SRS resource set to include a first SRS resource set associated with a first SRS resource set ID and a second SRS resource set associated with a second SRS resource set ID, wherein determining the at least one SRS resource set comprises determining the at least one SRS resource set based at least in part on an explicit indicator, associated with an uplink grant parameter of the CG PUSCH configuration, indicating the first SRS resource set ID and the second SRS resource set ID.

Aspect 20: A method of wireless communication performed by a base station, comprising: transmitting a configured grant (CG) physical uplink shared channel (PUSCH) configuration comprising at least one sounding reference signal (SRS) resource indicator associated with at least one set of PUSCH repetitions, the at least one SRS resource indicator indicating at least one SRS resource corresponding to at least one SRS resource set, wherein the at least one SRS resource set is listed in at least one of a first SRS resource set list or a second SRS resource set list, wherein at least one SRS resource set listed in the second SRS resource set list is a subset of a corresponding SRS resource set listed in the first SRS resource set list; and receiving the at least one set of PUSCH repetitions based at least in part on at least one set of PUSCH transmission parameters, wherein the at least one set of PUSCH transmission parameters is based at least in part on a determination of the at least one resource set.

Aspect 21: The method of Aspect 20, wherein the least one SRS resource indicator includes only one SRS resource indicator, and wherein the at least one SRS resource set includes only one SRS resource set.

Aspect 22: The method of Aspect 21, wherein the at least one SRS resource set is a first SRS resource set listed in the first SRS resource set list, having a usage indicator set to codebook or non-codebook, based at least in part on the only one SRS resource set comprising the first SRS resource set listed in the first SRS resource set list.

Aspect 23: The method of Aspect 22, wherein the first SRS resource set is the only SRS resource set listed in the first SRS resource set list.

Aspect 24: The method of either of Aspects 22 or 23, wherein the first SRS resource set listed in the first SRS resource set list comprises an SRS resource set having a lower SRS resource set identifier (ID) value than any other SRS resource set ID value associated with any other SRS resource set listed in the first SRS resource set list.

Aspect 25: The method of Aspect 21, wherein the at least one SRS resource set is a first SRS resource set listed in the second SRS resource set list, having a usage indicator set to codebook or non-codebook, based at least in part on the only one SRS resource set comprising a first SRS resource set listed in the second SRS resource set list.

Aspect 26: The method of Aspect 25, wherein the first SRS resource set listed in the second SRS resource set list is the only SRS resource set listed in the second SRS resource set list.

Aspect 27: The method of either of Aspects 25 or 26, wherein the first SRS resource set listed in the second SRS resource set list comprises an SRS resource set having a lower SRS resource set identifier (ID) value than any other SRS resource set ID value associated with any other SRS resource set listed in the second SRS resource set list.

Aspect 28: The method of Aspect 21, wherein the CG PUSCH configuration includes an indicator bit, wherein the at least one SRS resource set is the only one SRS resource set, and wherein the only one SRS resource set comprises: a first SRS resource set listed in the first SRS resource set list based at least in part on the indicator bit having a first value, or a first SRS resource set listed in the second SRS resource set list based at least in part on the indicator bit having a second value.

Aspect 29: The method of Aspect 21, wherein the at least one SRS resource set is an SRS resource set associated with an SRS resource set identifier (ID), associated with the only one SRS resource set, based at least in part on an explicit indicator, associated with an uplink grant parameter of the CG PUSCH configuration, indicating the SRS resource set ID.

Aspect 30: The method of Aspect 20, wherein the least one SRS resource indicator includes a first SRS resource indicator and a second SRS resource indicator, wherein the at least one set of PUSCH repetitions comprises a first set of PUSCH repetitions associated with a first SRS resource set and a second set of PUSCH repetitions associated with a second SRS resource set, and wherein the first SRS resource set and the second SRS resource set are listed in the at least one of the first SRS resource set list or the second SRS resource set list.

Aspect 31: The method of Aspect 30, wherein the determination of the at least one SRS resource set comprises: a determination that the first SRS resource set comprises a first SRS resource set listed in the first SRS resource set list and having a first usage indicator set to codebook or non-codebook; and the second SRS resource set comprises a second SRS resource set listed in the first SRS resource set list and having a second usage indicator set to codebook or non-codebook.

Aspect 32: The method of Aspect 31, wherein the determination of the at least one SRS resource set is based at least in part on the first SRS resource set list listing the second SRS resource set.

Aspect 33: The method of Aspect 31, wherein the determination of the at least one SRS resource set is based at least in part on the first SRS resource set list listing only the first SRS resource set.

Aspect 34: The method of Aspect 30, wherein the determination of the at least one SRS resource set comprises: a determination that the first SRS resource set comprises a first SRS resource set listed in the second SRS resource set list and having a first usage indicator set to codebook or non-codebook; and a determination that the second SRS resource set comprises a second SRS resource set listed in the second SRS resource set list and having a second usage indicator set to codebook or non-codebook.

Aspect 35: The method of Aspect 30, wherein the determination of the at least one SRS resource set is based at least in part on the second SRS resource set list listing the first SRS resource set and the second SRS resource set.

Aspect 36: The method of Aspect 30, wherein the CG PUSCH configuration includes an indicator bit, and wherein the determination of the at least one SRS resource set comprises: a determination that the first SRS resource set is a first SRS resource set listed in the first SRS resource set list based at least in part on the indicator bit having a first value, or a determination that the first SRS resource set is a first SRS resource set listed in the second SRS resource set list based at least in part on the indicator bit having a second value.

Aspect 37: The method of Aspect 30, wherein the CG PUSCH configuration includes an indicator bit, and wherein the determination of the at least one SRS resource set comprises: a determination that the second SRS resource set is a second SRS resource set listed in the first SRS resource set list based at least in part on the indicator bit having a first value, or a determination that the second SRS resource set is a second SRS resource set listed in the second SRS resource set list based at least in part on the indicator bit having a second value.

Aspect 38: The method of Aspect 30, wherein a first SRS resource set identifier (ID) corresponds to the first SRS resource set and a second SRS resource set ID corresponds to the second SRS resource set, wherein the determination of the at least one SRS resource set comprises a determination that the at least one SRS resource set includes a first SRS resource set associated with a first SRS resource set ID and a second SRS resource set associated with a second SRS resource set ID, wherein the determination of the at least one SRS resource set is based at least in part on an explicit indicator, associated with an uplink grant parameter of the CG PUSCH configuration, indicating the first SRS resource set ID and the second SRS resource set ID.

Aspect 39: An apparatus for wireless communication at a device, comprising a processor; memory coupled with the processor; and instructions stored in the memory and executable by the processor to cause the apparatus to perform the method of one or more of Aspects 1-19.

Aspect 40: A device for wireless communication, comprising a memory and one or more processors coupled to the memory, the one or more processors configured to perform the method of one or more of Aspects 1-19.

Aspect 41: An apparatus for wireless communication, comprising at least one means for performing the method of one or more of Aspects 1-19.

Aspect 42: A non-transitory computer-readable medium storing code for wireless communication, the code comprising instructions executable by a processor to perform the method of one or more of Aspects 1-19.

Aspect 43: A non-transitory computer-readable medium storing a set of instructions for wireless communication, the set of instructions comprising one or more instructions that, when executed by one or more processors of a device, cause the device to perform the method of one or more of Aspects 1-19.

Aspect 44: An apparatus for wireless communication at a device, comprising a processor; memory coupled with the processor; and instructions stored in the memory and executable by the processor to cause the apparatus to perform the method of one or more of Aspects 20-38.

Aspect 45: A device for wireless communication, comprising a memory and one or more processors coupled to the memory, the one or more processors configured to perform the method of one or more of Aspects 20-38.

Aspect 46: An apparatus for wireless communication, comprising at least one means for performing the method of one or more of Aspects 20-38.

Aspect 47: A non-transitory computer-readable medium storing code for wireless communication, the code comprising instructions executable by a processor to perform the method of one or more of Aspects 20-38.

Aspect 48: A non-transitory computer-readable medium storing a set of instructions for wireless communication, the set of instructions comprising one or more instructions that, when executed by one or more processors of a device, cause the device to perform the method of one or more of Aspects 20-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication, comprising:
at least one processor; and
at least one memory coupled with the at least one processor, wherein the at least one processor is configured to cause the apparatus to:
receive a sounding reference signal (SRS) configuration that indicates:
a respective single SRS resource set in each SRS resource set list of one or more SRS resource set lists, or
a respective plurality of SRS resource sets in each SRS resource set list of the one or more SRS resource set lists;
receive a configured grant (CG) physical uplink shared channel (PUSCH) configuration comprising at least one SRS resource indicator associated with at least one set of PUSCH repetitions, wherein:
the at least one SRS resource indicator includes only one SRS resource indicator when the SRS configuration indicates the respective single SRS resource set in each SRS resource set list of the one or more SRS resource set lists,
the at least one SRS resource indicator includes a first SRS resource indicator and a second SRS resource indicator when the SRS configuration indicates the respective plurality of SRS resource sets in each SRS resource set list of the one or more SRS resource set lists,
the at least one SRS resource indicator indicates at least one SRS resource corresponding to at least one SRS resource set,
the at least one SRS resource set is listed in at least one of a first SRS resource set list of the one or more SRS resource set lists or a second SRS resource set list of the one or more SRS resource set lists,
at least one SRS resource set listed in the second SRS resource set list is a subset of a corresponding SRS resource set listed in the first SRS resource set list, and
the at least one set of PUSCH repetitions comprises a first set of PUSCH repetitions associated with a first SRS resource set and a second set of PUSCH repetitions associated with a second SRS resource set; and
transmit the at least one set of PUSCH repetitions based at least in part on at least one set of PUSCH transmission parameters, the at least one set of PUSCH transmission parameters being based at least in part on the at least one SRS resource set.

2. The apparatus of claim 1,
wherein the at least one SRS resource indicator includes the only one SRS resource indicator, and wherein the at least one SRS resource set includes only one SRS resource set.

3. The apparatus of claim 2,
wherein the at least one SRS resource set is a first SRS resource set having a usage indicator set to codebook or non-codebook that is listed in the first SRS resource set list, based at least in part on the only one SRS resource set comprising the first SRS resource set listed in the first SRS resource set list.

4. The apparatus of claim 2,
wherein the at least one SRS resource set is a first SRS resource set having a usage indicator set to codebook or non-codebook that is listed in the second SRS resource set list, based at least in part on the only one SRS resource set comprising a first SRS resource set listed in the second SRS resource set list.

5. The apparatus of claim 2,
wherein the CG PUSCH configuration includes an indicator bit, wherein the only one SRS resource set comprises:
   a first SRS resource set listed in the first SRS resource set list based at least in part on the indicator bit having a first value, or
   a first SRS resource set listed in the second SRS resource set list based at least in part on the indicator bit having a second value.

6. The apparatus of claim 2,
wherein the at least one SRS resource set is an SRS resource set associated with an SRS resource set identifier (ID), associated with the only one SRS resource set, based at least in part on an explicit indicator, associated with an uplink grant parameter of the CG PUSCH configuration, indicating the SRS resource set ID.

7. The apparatus of claim 1,
wherein the at least one SRS resource indicator includes the first SRS resource indicator and the second SRS resource indicator, and wherein the first SRS resource set and the second SRS resource set are listed in the at least one of the first SRS resource set list or the second SRS resource set list.

8. The apparatus of claim 7,
wherein the at least one SRS resource set is based at least in part on:
   the first SRS resource set comprising a first SRS resource set listed in the first SRS resource set list and having a first usage indicator set to codebook or non-codebook; and
   the second SRS resource set comprising a second SRS resource set listed in the first SRS resource set list and having a second usage indicator set to codebook or non-codebook.

9. The apparatus of claim 8,
wherein the at least one SRS resource set is based at least in part on the first SRS resource set list listing the second SRS resource set.

10. The apparatus of claim 7,
wherein the at least one SRS resource set is based at least in part on:
   the first SRS resource set comprising a first SRS resource set listed in the second SRS resource set list and having a first usage indicator set to codebook or non-codebook; and
   the second SRS resource set comprising a second SRS resource set listed in the second SRS resource set list and having a second usage indicator set to codebook or non-codebook.

11. The apparatus of claim 7,
wherein the at least one SRS resource set is based at least in part on the second SRS resource set list listing the first SRS resource set and the second SRS resource set.

12. The apparatus of claim 7,
wherein the CG PUSCH configuration includes an indicator bit, and wherein the at least one SRS resource set is based at least in part on:
   the first SRS resource set being a first SRS resource set listed in the first SRS resource set list based at least in part on the indicator bit having a first value, or
   the first SRS resource set being a first SRS resource set listed in the second SRS resource set list based at least in part on the indicator bit having a second value.

13. The apparatus of claim 7,
wherein the CG PUSCH configuration includes an indicator bit, and wherein the at least one SRS resource set is based at least in part on:
   the second SRS resource set being a second SRS resource set listed in the first SRS resource set list based at least in part on the indicator bit having a first value, or
   the second SRS resource set being a second SRS resource set listed in the second SRS resource set list based at least in part on the indicator bit having a second value.

14. The apparatus of claim 7,
wherein a first SRS resource set identifier (ID) corresponds to the first SRS resource set and a second SRS resource set ID corresponds to the second SRS resource set, wherein the at least one SRS resource set includes a first SRS resource set associated with a first SRS resource set ID and a second SRS resource set associated with a second SRS resource set ID, wherein the at least one SRS resource set is based at least in part on the at least one SRS resource set being based at least in part on an explicit indicator, associated with an uplink grant parameter of the CG PUSCH configuration, indicating the first SRS resource set ID and the second SRS resource set ID.

15. An apparatus for wireless communication, comprising:
   at least one processor; and
   at least one memory communicatively coupled with the at least one processor, wherein the at least one processor is configured to cause the apparatus to:
      transmit a sounding reference signal (SRS) configuration that indicates:
         a respective single SRS resource set in each SRS resource set list of one or more SRS resource set lists, or
         a respective plurality of SRS resource sets in each SRS resource set list of the one or more SRS resource set lists;
      transmit a configured grant (CG) physical uplink shared channel (PUSCH) configuration comprising at least one sounding reference signal (SRS) resource indicator associated with at least one set of PUSCH repetitions, wherein:
         the at least one SRS resource indicator includes only one SRS resource indicator when the SRS configuration indicates the respective single SRS resource set in each SRS resource set list of the one or more SRS resource set lists,
         the at least one SRS resource indicator includes a first SRS resource indicator and a second SRS resource indicator when the SRS configuration indicates the respective plurality of SRS resource sets in each SRS resource set list of the one or more SRS resource set lists, the at least one SRS resource indicator indicates at least one SRS resource corresponding to at least one SRS resource set, the at least one SRS resource set is listed in at least one of a first SRS resource set list of the one or more SRS resource set lists or a second SRS resource set list of the one or more SRS resource set lists, at least one SRS resource set listed in the second SRS resource set list is a subset of a corresponding SRS resource set listed in the first SRS resource set list, and the at least one set of PUSCH repetitions comprises a first set of PUSCH repetitions associated with a first SRS resource set and a second set of PUSCH repetitions associated with a second SRS resource set; and receive the at least one set of PUSCH repetitions based at least in part on at least one set of PUSCH transmission parameters, wherein the at least one set of PUSCH transmission parameters is based at least in part on the at least one resource set.

16. The apparatus of claim 15,
wherein the at least one SRS resource indicator includes only one SRS resource indicator, and wherein the at least one SRS resource set includes only one SRS resource set.

17. The apparatus of claim 16,
wherein the at least one SRS resource set is a first SRS resource set having a usage indicator set to codebook or non-codebook that is listed in the first SRS resource set list, based at least in part on the only one SRS resource set comprising the first SRS resource set listed in the first SRS resource set list.

18. The apparatus of claim 16,
wherein the at least one SRS resource set is a first SRS resource set having a usage indicator set to codebook or non-codebook that is listed in the second SRS resource set list, based at least in part on the only one SRS resource set comprising a first SRS resource set listed in the second SRS resource set list.

19. The apparatus of claim 16,
wherein the CG PUSCH configuration includes an indicator bit, wherein the only one SRS resource set comprises:
a first SRS resource set listed in the first SRS resource set list based at least in part on the indicator bit having a first value, or
a first SRS resource set listed in the second SRS resource set list based at least in part on the indicator bit having a second value.

20. The apparatus of claim 15,
wherein the at least one SRS resource indicator includes the first SRS resource indicator and the second SRS resource indicator, and wherein the first SRS resource set and the second SRS resource set are listed in the at least one of the first SRS resource set list or the second SRS resource set list.

21. The apparatus of claim 20,
wherein the at least one SRS resource set is based at least in part on:
the first SRS resource set comprising a first SRS resource set listed in the second SRS resource set list and having a first usage indicator set to codebook or non-codebook; and the second SRS resource set comprising a second SRS resource set listed in the second SRS resource set list and having a second usage indicator set to codebook or non-codebook.

22. The apparatus of claim 20,
wherein the at least one SRS resource set is based at least in part on the second SRS resource set list listing the first SRS resource set and the second SRS resource set.

23. The apparatus of claim 20,
wherein the at least one SRS resource set is based at least in part on:
the first SRS resource set comprising a first SRS resource set listed in the first SRS resource set list and having a first usage indicator set to codebook or non-codebook; and
the second SRS resource set comprising a second SRS resource set listed in the first SRS resource set list and having a second usage indicator set to codebook or non-codebook.

24. The apparatus of claim 20,
wherein the CG PUSCH configuration includes an indicator bit, and wherein the at least one SRS resource set is based at least in part on:
the first SRS resource set being a first SRS resource set listed in the first SRS resource set list based at least in part on the indicator bit having a first value, or
the first SRS resource set being a first SRS resource set listed in the second SRS resource set list based at least in part on the indicator bit having a second value.

25. A method of wireless communication performed by an apparatus, comprising:
receiving a sounding reference signal (SRS) configuration that indicates:
a respective single SRS resource set in each SRS resource set list of one or more SRS resource set lists, or
a respective plurality of SRS resource sets in each SRS resource set list of the one or more SRS resource set lists;
receiving a configured grant (CG) physical uplink shared channel (PUSCH) configuration comprising at least one sounding reference signal (SRS) resource indicator associated with at least one set of PUSCH repetitions, wherein:
the at least one SRS resource indicator includes only one SRS resource indicator when the SRS configuration indicates the respective single SRS resource set in each SRS resource set list of the one or more SRS resource set lists,
the at least one SRS resource indicator includes a first SRS resource indicator and a second SRS resource indicator when the SRS configuration indicates the respective plurality of SRS resource sets in each SRS resource set list of the one or more SRS resource set lists,
the at least one SRS resource indicator indicates at least one SRS resource corresponding to at least one SRS resource set,
the at least one SRS resource set is listed in at least one of a first SRS resource set list of the one or more SRS resource set lists or a second SRS resource set list of the one or more SRS resource set lists,
at least one SRS resource set listed in the second SRS resource set list is a subset of a corresponding SRS resource set listed in the first SRS resource set list, and

the at least one set of PUSCH repetitions comprises a
first set of PUSCH repetitions associated with a first
SRS resource set and a second set of PUSCH rep-
etitions associated with a second SRS resource set;
and transmitting the at least one set of PUSCH repetitions
based at least in part on at least one set of PUSCH
transmission parameters, the at least one set of PUSCH
transmission parameters being based at least in part on
the at least one SRS resource set.

26. The method of claim 25, wherein the at least one SRS resource indicator includes
the only one SRS resource indicator, and wherein the at
least one SRS resource set includes only one SRS
resource set.

27. The method of claim 25, wherein the at least one SRS resource indicator includes
the first SRS resource indicator and the second SRS
resource indicator, and wherein the first SRS resource
set and the second SRS resource set are listed in the at
least one of the first SRS resource set list or the second
SRS resource set list.

28. The method of claim 27, wherein the at least one SRS resource set is based at least
in part on:

the first SRS resource set comprising a first SRS
resource set listed in the second SRS resource set list
and having a first usage indicator set to codebook or
non-codebook; and the second SRS resource set comprising a second SRS
resource set listed in the second SRS resource set list
and having a second usage indicator set to codebook
or non-codebook.

29. A method of wireless communication performed by an
apparatus, comprising:

transmitting a sounding reference signal (SRS) configu-
ration that indicates:

a respective single SRS resource set in each SRS
resource set list of one or more SRS resource set
lists, or a respective plurality of SRS resource sets in each SRS
resource set list of the one or more SRS resource set
lists;

46 transmitting a configured grant (CG) physical uplink
shared channel (PUSCH) configuration comprising at
least one sounding reference signal (SRS) resource
indicator associated with at least one set of PUSCH
repetitions, wherein:

the at least one SRS resource indicator includes only
one SRS resource indicator when the SRS configu-
ration indicates the respective single SRS resource
set in each SRS resource set list of the one or more
SRS resource set lists, the at least one SRS resource indicator includes a first
SRS resource indicator and a second SRS resource
indicator when the SRS configuration indicates the
respective plurality of SRS resource sets in each SRS
resource set list of the one or more SRS resource set
lists, the at least one SRS resource indicator indicates at least
one SRS resource corresponding to at least one SRS
resource set, the at least one SRS resource set is listed in at least one
of a first SRS resource set list of the one or more SRS
resource set lists or a second SRS resource set list of
the one or more SRS resource set lists, at least one SRS resource set listed in the second SRS
resource set list is a subset of a corresponding SRS
resource set listed in the first SRS resource set list,
and the at least one set of PUSCH repetitions comprises a
first set of PUSCH repetitions associated with a first
SRS resource set and a second set of PUSCH rep-
etitions associated with a second SRS resource set;
and receiving the at least one set of PUSCH repetitions based
at least in part on at least one set of PUSCH transmis-
sion parameters, wherein the at least one set of PUSCH
transmission parameters is based at least in part on the
at least one resource set.

30. The method of claim 29, wherein the at least one SRS resource indicator includes
the only one SRS resource indicator, and wherein the at
least one SRS resource set includes only one SRS
resource set.

* * * * *